US012093187B1

(12) United States Patent
Shveidel et al.

(10) Patent No.: US 12,093,187 B1
(45) Date of Patent: Sep. 17, 2024

(54) READ I/O PROCESSING TECHNIQUES USING REMOTE MAPPING RESOLUTION WITH LOGICAL ADDRESS SPACE SLICING

(71) Applicant: Dell Products L.P., Hopkinton, MA (US)

(72) Inventors: Vladimir Shveidel, Pardes-Hana (IL); Uri Shabi, Tel Mond (IL); Dror Zalstein, Givatayim (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/129,283

(22) Filed: Mar. 31, 2023

(51) Int. Cl.

| | |
|---|---|
| ***G06F 12/00*** | (2006.01) |
| ***G06F 3/06*** | (2006.01) |
| ***G06F 12/06*** | (2006.01) |
| ***G06F 12/109*** | (2016.01) |
| ***G06F 13/16*** | (2006.01) |

(52) U.S. Cl.
CPC .......... *G06F 12/109* (2013.01); *G06F 3/0604* (2013.01); *G06F 3/0667* (2013.01); *G06F 3/0683* (2013.01); *G06F 12/06* (2013.01); *G06F 13/1668* (2013.01); *G06F 2212/657* (2013.01)

(58) Field of Classification Search
CPC .... G06F 3/0604; G06F 3/0677; G06F 3/0683; G06F 3/0617; G06F 12/10; G06F 2212/202; G06F 2212/65
See application file for complete search history.

(56) References Cited

U.S. PATENT DOCUMENTS

| | | | | |
|---|---|---|---|---|
| 11,409,454 | B1 * | 8/2022 | Shveidel | G06F 3/0635 |
| 2021/0011776 | A1 * | 1/2021 | Thirumalai | G06F 3/067 |
| 2021/0149816 | A1 * | 5/2021 | Bak | G06F 12/1441 |
| 2022/0342552 | A1 * | 10/2022 | Oohira | G06F 3/065 |
| 2023/0083104 | A1 * | 3/2023 | Xiang | G06F 3/0659 707/692 |
| 2023/0333766 | A1 * | 10/2023 | Xiang | G06F 3/0619 |
| 2024/0111429 | A1 * | 4/2024 | Vankamamidi | G06F 3/064 |

OTHER PUBLICATIONS

U.S. Appl. No. 18/160,404, filed Jan. 27, 2023, entitled System and Method for Managing Data Portion Ownership in a Storage Cluster, to Vladimir Shveidel, et al.
U.S. Appl. No. 18/134,881, filed Apr. 14, 2023, entitled Exclusive Ownership of Logical Address Slices and Associated Metadata, to Vasudevan Subramanian, et al.

* cited by examiner

*Primary Examiner* — John A Lane
(74) *Attorney, Agent, or Firm* — Muirhead and Saturnelli, LLC

(57) ABSTRACT

Logical address space portions and virtual layer blocks (VLBs) can be partitioned into multiple sets. Each of multiple nodes in a system can be assigned exclusive ownership of one of the multiple sets. In at least one embodiment, for a read I/O which is received at a first node and directed to a logical address LA1 that is owned by a second node, the first node can request that the second owning node perform resolution processing for LA1. The second node can return either a VLB address or a PLB address based on whether the second node owns a VLB used in mapping LA1 to a corresponding physical location PA1 which includes content C1 stored at LA1. The second node can set a flag in its response to indicate whether a returned address is a VLB address or a PLB address.

20 Claims, 15 Drawing Sheets

READ I/O PROCESSING TECHNIQUES USING REMOTE MAPPING RESOLUTION WITH LOGICAL ADDRESS SPACE SLICING

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving, at a first node from a host, a read I/O operation requesting to read content C1 from a first logical address LA1, where the first node and a second node are included in a data storage system; determining that LA1 is owned by the second node but not owned by the first node; sending, from the first node to the second node, a first request requesting that the second node perform first resolution processing for LA1; and responsive to receiving the first request at the second node, the second node performing said first resolution processing for LA1, wherein said first resolution processing includes: mapping LA1 to a first entry E1 of a first metadata (MD) leaf object, wherein E1 includes a first virtual layer block (VLB) address which corresponds to a first VLB of a virtual block layer; determining whether the second node owns the first VLB; responsive to determining the second node does not own the first VLB, sending a first response from the second node to first node, where the first response includes the first VLB address and includes a first indicator with a first setting which indicates that the first response includes a VLB address type; and responsive to determining that second node does own the first VLB, performing first processing including: the second node using the first VLB address to obtain a first physical address or location PA1 on non-volatile storage, wherein C1 is stored at PA1; and sending the first response from the second node to the first node, wherein the first response includes PA1 and includes the first indicator with a second setting which indicates that the first response includes a physical layer block (PLB) address type.

In at least one embodiment, the VLB address type can be an indirect pointer or address used to indirectly access stored content. The PLB address type can be a physical address or location of stored content on non-volatile storage. Processing can include: receiving, at the first node from the second node, the first response; determining, by the first node, whether the first indicator of the first response has the first setting or the second setting; and responsive to determining that the first indicator has the first setting, the first node determining that the first response includes the VLB address type, and the first node performing second processing which includes using the first VLB address to read C1 from PA1.

In at least one embodiment, the first VLB address can identify a VLB entry E2 of the first VLB, wherein E2 includes PA1, and wherein the second processing can include: reading, by the first node, the first VLB from non-volatile storage; caching, by the first node, the first VLB in a local cache of the first node; reading, by the first node, PA1 from E2 of the first VLB; reading, by the first node, C1 which is stored at PA1 on non-volatile storage; and returning, by the first node, C1 to the host in a read I/O response. Responsive to determining that the first indicator has the second setting, the first node can determine that the first response includes the PLB address type, and third processing can be performed which includes: reading, by the first node, C1 from PA1; and returning, by the first node, C1 to the host in a read I/O response. The second node using the first VLB address to obtain PA1 can further comprise: reading, by the second node, the first VLB from non-volatile storage; caching, by the second node, the first VLB in a local cache of the second node; and reading, by the second node, PA1 from E2 of the first VLB.

In at least one embodiment, processing can include: partitioning a plurality of virtual layer blocks (VLBs) of the virtual block layer into a plurality of sets including a first set and a second set, wherein the first node is assigned exclusive ownership of VLBs in the first set and wherein the second node is assigned exclusive ownership of VLBs in the second set. Processing can include: partitioning a logical address space into a plurality of logical address portions; dividing the plurality of logical address portions into a plurality of logical address sets including a first logical address set and a second logical address sets, wherein the first node is assigned exclusive ownership of logical address portions of the first logical address set, and wherein the second node is assigned exclusive ownership of logical address portions of the second logical address set.

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method.

The method can comprise: receiving, at a first node from a host, a read I/O operation requesting to read content C1 from a first logical address LA1, where the first node and a second node are included in a data storage system; determining that LA1 is owned by the first node; the first node performing first resolution processing for LA1, wherein the first resolution processing includes the first node mapping LA1 to a first entry E1 of a first metadata (MD) leaf object, wherein E1 includes a first virtual layer block (VLB) address which corresponds to a first VLB of a virtual block layer; determining, by the first node, whether the first node or the second node owns the first VLB; responsive to determining that the first node owns the first VLB, performing first processing including: the first node using the first VLB address to obtain a first physical address or location PA1 on non-volatile storage, wherein C1 is stored at PA1; the first node reading C1 from PA1; and the first node returning C1 to the host in a read I/O response.

In at least one embodiment, the first VLB address can identify a second entry E2 of the first VLB, and wherein the first node using the first VLB address to obtain a first physical address or location PA1 on non-volatile storage can further include: the first node reading the first VLB from non-volatile storage; the first node caching the first VLB in a local cache of the first node; and the first node reading PA1 from E2 of the first VLB. Processing can include: determining, by the first node, that the second node owns the first VLB; and responsive to determining that the second node owns the first VLB, performing second processing including: selecting one option from a plurality of processing options; performing processing of the selected one option to obtain PA1 for the first node; the first node using PA1 to read C1 from non-volatile storage; and the first node returning C1 in a read I/O response to the host.

In at least one embodiment, the plurality of options can include a first option, and wherein processing of the first option can include: sending a request, from the first node to the second node, requesting that the second node map the first VLB address of the first VLB to a corresponding physical address, PA1; receiving, by the second node, the request; reading, by the second node, the first VLB from non-volatile storage; storing the first VLB in a local cache of the second node; reading, by the second node, PA1 from E2 of the first VLB; and the second node returning a response to the first node, wherein the response includes PAL.

In at least one embodiment, the plurality of options can include a second option, wherein processing of the second option can include: the first node reading the first VLB from non-volatile storage and not caching the first VLB locally on the first node; and the first node reading PA1 from E2 of the first VLB.

In at least one embodiment, the plurality of options can include a third option, wherein processing of the third option can include: the first node reading the first VLB from non-volatile storage; the first node caching the first VLB locally on the first node; and the first node reading PA1 from E2 of the first VLB.

In at least one embodiment, selecting the one option from the plurality of options can include evaluating one or more criteria dynamically at runtime to select said one option from the plurality of options. The one or more criteria can select the one option in accordance with one or more metrics including any of: latency introduced by issuing a request from the first node to the second node; a VLB page cache hit rate with respect a first local cache of the first node; a VLB page cache hit rate with respect a second local cache of the second node; and a current utilization of backend non-volatile storage including PA1 where C1 is stored. The one or more criteria can include a first criterion which indicates to select a first option of the plurality of options if the latency is less than a specified threshold, and wherein the first option can include issuing the request, from the first node to the second node, requesting that the second node map the first VLB address of the first VLB to a corresponding physical address, PAL. The one or more criteria can include a second criterion which indicates to select a second option of the plurality of options or a third option of the plurality of options if the latency is not less than the specified threshold and if the current utilization of backend non-volatile storage is less than a utilization threshold, wherein the second option and the third option can both include the first node locally reading the first VLB from backend non-volatile storage.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
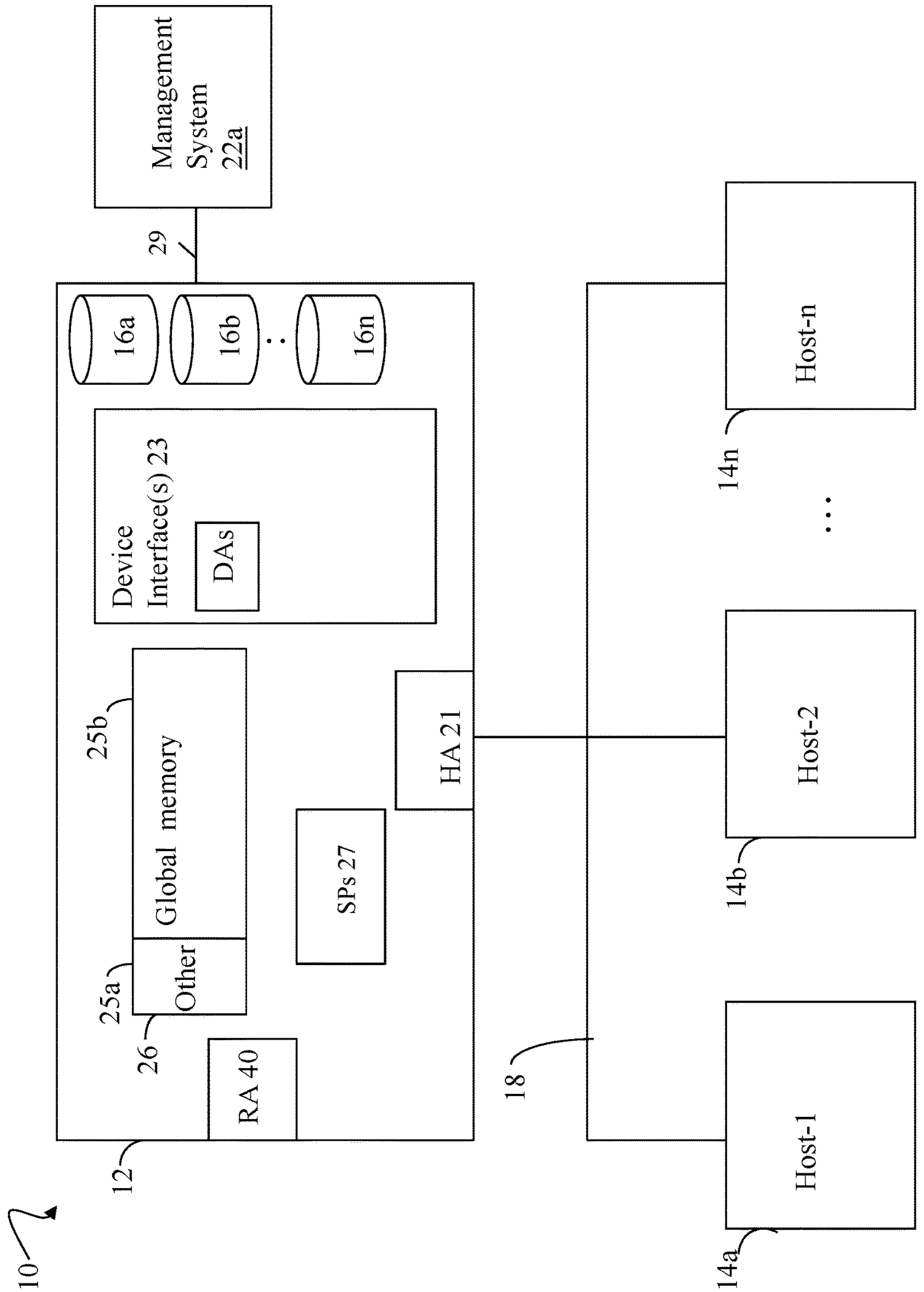
FIG. 1 is an example of components that may be included in a system in accordance with the techniques of the present disclosure.

Existing systems, such as data storage systems, can maintain and utilize a data cache to store frequently accessed pages of data. The data cache can be, for example, a form of fast volatile memory such as a volatile form of random access memory (RAM). In particular, the data cache can be used as a read data cache to store user data which is frequently read. For a read I/O requesting read data, the read data which is stored in the cache results in a cache hit or read cache hit. For a read cache hit, the requested read data can be retrieved from the cache and returned to the requester or originator of the read I/O. If the requested read data is not in the cache, a cache miss or read cache miss results where the requested read data can be retrieved from longer term backend (BE) non-volatile storage. A cache miss as compared to a cache hit results in an I/O performance penalty and increased I/O latency in order to service the read I/O and return the requested read data to the requester. The data cache can provide for read cache hits and optimized performance such as by providing for improved I/O latency and improved utilization of system resources. Generally, the data cache, and cache memory in general, can be characterized as a critical and expensive resource which can have a limited size or capacity. Accordingly, it is important for systems to utilize the data cache, and more generally cache storage, efficiently to provide for optimal performance.

In at least one existing system, mapping information can be used to map a logical address to a corresponding physical storage location or address storing the user data or content of the logical address. The mapping information can be a chain of metadata (MD) pages traversed to obtain the content of a logical address from its corresponding physical storage location or address on BE non-volatile storage. Thus, a read cache miss with respect to a read I/O requesting to read user data from a logical address can result in a cache miss with respect to the data cache noted above. Read cache miss processing can incur a performance penalty as noted above, at least in part, due to the traversal of the chain of MD pages of the mapping information. The MD pages of mapping information can also be stored on BE non-volatile storage. Thus, traversing the chain of MD page can include retrieving each MD page of the chain from BE non-volatile storage thereby incurring additional performance penalties to access. To further improve performance, a system can also store the mapping information, such as the chain of MD pages, in the cache. However, as with the user data and the limited size of the cache, not all mapping information or MD pages for all user data can be stored in the cache. As a result, accessing the multiple layers or levels of MD pages which can be needed for accessing the read data to service a read cache miss can result in additional cache misses thereby incurring an additional performance penalty to access any uncached MD pages of mapping information from BE non-volatile storage.

Some system can include multiple processing nodes where the multiple processing nodes can service I/Os. In such systems, cache usage can be even more inefficient across the multiple processing nodes since the same MD and/or user data or content for servicing I/Os can be cached in node-local caches of all the multiple processing nodes. For example, pages of the same user data and/or MD can be cached locally in caches of the multiple processing nodes. To improve upon the foregoing, an architecture can be utilized which partitions ownership of the logical address space of user data or content among the multiple processing nodes. In one such architecture, a node assigned a particular logical address can be designated as the exclusive owner of the logical address. A node can service I/Os directed to logical addresses owned by the node. If the node receives an I/O directed to a logical address not owned by the node, the receiving node can forward the I/O for servicing or processing to the owning node. Generally, an exclusive ownership assignment can also be characterized as a strong ownership. In contrast, a non-exclusive ownership assignment can also be characterized as a weak ownership.

The architecture can also assign strong ownership to some MD pages and assign weak ownership to other MD pages. Strong ownership of a MD page assigned to a node can denote exclusive ownership of the assigned MD page by the node. Weak ownership of a MD page can indicate that the MD page can be owned by more than one node and thus can denote non-exclusive ownership of the MD page shared by multiple nodes. Thus, those MD pages having associated weak ownership can lead to caching inefficiencies since the same weakly owned MD page can be cached locally in local caches of multiple nodes. In particular, a virtual layer of the mapping information can include multiple virtual layer blocks (VLBs) used in connection with mapping user data logical addresses to corresponding physical locations or addresses containing content stored at corresponding logical addresses. VLBs can be weakly owned and thus can be regularly cached in duplicate in multiple local caches of multiple nodes.

Accordingly, described in the present disclosure are techniques that overcome the foregoing drawbacks and provide for improved and efficient cache usage.

In at least one embodiment, the techniques of the present disclosure provide for assigning ownership of the VLBs of the virtual layer among the multiple nodes of the system. In at least one embodiment, the VLBs of the virtual layer can be partitioned into multiple sets, where exclusive ownership of one of the multiple sets of VLBs is assigned to a corresponding one of the multiple nodes. In at least one embodiment, exclusive ownership of each VLB can be assigned to a single one of the nodes.

In at least one embodiment, a node which receives an I/O operation can be referred to as the initiator node with respect to that particular I/O operation.

In at least one embodiment, exclusive ownership, such as with respect to a portion of logical address space as well as a VLB or other metadata portion may include a strong ownership or include the exclusive locking by a particular node, where such ownership is not shared with another node. In at least one embodiment, a storage node assigned exclusive ownership over a logical address or a metadata portion does not yield access to that logical address or metadata portion to another node.

In at least one embodiment, an architecture can be utilized which partitions ownership of the logical address space of user data or content among the multiple processing nodes. In at least one embodiment, a node assigned a particular logical address can be designated as the exclusive owner of the logical address. If the node receives an I/O directed to a logical address not owned by the node, the receiving node can forward or redirect the I/O for servicing or processing to the owning node. In at least one embodiment, the I/Os can include read I/Os. For a read I/O directed to a target logical address LA1 where the read I/O is received by an initiator node which does not own LA1, the initiator node can issue a remote procedure call (RPC) to its peer node to service the read, where the peer node owns LA1. In at least one embodiment, the RPC for the read I/O can be a request from the initiator node to a peer node (owner of LA1) to perform processing in connection with MD pages of mapping information for LA1. In particular, the RPC for the read I/O can be a request for the peer node (which owns the logical address LA1) to perform mapping resolution processing for LA1. The resolution processing can include mapping LA1 to a corresponding VLB address or physical layer block (PLB) address. The resolution processing can be in accordance with the chain of MD pages of mapping information for LA1. The resolution processing can include traversing one or more of the MD pages of the chain of mapping information for LA1. The VLB address can be a location or address of an offset or entry of a VLB included in the chain of MD pages of mapping information used to map LA1 to a corresponding PLB address. The PLB address can be a physical location or address of a PLB (or physical location or address within a PLB) including the content C1 stored at LA1. Thus, the VLB address can be an indirect pointer or address used to indirectly access the content C1 stored at LA1. The PLB address can be a pointer to, or address of, a physical storage location on BE non-volatile storage, where the physical storage location contains the content C1 stored at LA1.

In at least one embodiment, the peer node, which owns LA1 and receives the RPC from the initiator node, can return either a VLB address V1 or a PLB address PAL. In at least one embodiment, the peer node can return a PLB address if the peer node is the exclusive owner of the VLB, VLB1, where V1 is an address or offset of an entry within VLB1, where V1 is included in the mapping information used to map LA1 to PA1, and where PA1 is the physical address or location of C1 stored at LAL. If the peer node receiving the RPC owns LA1 and also owns VLB1 including V1, the peer node continues performing additional resolution processing using V1. In particular, V1 can denote an address, offset or location of an entry E1 within VLB1, where E1 includes the PLB address PAL. In this manner, the resolution processing can include mapping LA1 to V1, and then reading the contents stored at V1 (e.g., the contents stored at entry E1 of VLB1), where PA1 is the contents stored at V1.

In at least one embodiment, the peer node receiving the RPC can return the VLB address V1 if the peer node is not the exclusive owner of the VLB, VLB1, where VLB1 includes the VLB address V1, where V1 is included in the mapping information used to map LA1 to PA1, and where PA1 is the physical address or location of C1 stored at LA1. In connection with the foregoing case, V1 is the address of an entry E1 in VLB1 where PA1 is included in the entry E1 of VLB1. If the peer node receiving the RPC owns LA1 but does not own VLB1 including V1, the peer node can simply return V1 (an address or pointer to the entry E1 of VLB1) without performing the additional resolution processing noted above.

In at least one embodiment, in response to the RPC, the peer node owning LA1 can return information including either the VLB address V1 or the PLB address PA1 depending on whether the peer node owns VLB1 which includes a corresponding entry, location or address denoted by V1. In such an embodiment, the flag IS_PLB can be included in an RPC response or reply sent from the peer node to the initiator node, where the initiator node sent the RPC. The IS_PLB flag can denote the address or pointer type returned as either a VLB address type or a PLB address type. The initiator node can then examine the IS_PLB flag to interpret the returned address as either a VLB address or a PLB address. If the IS_PLB flag=1 (e.g., is true or on) and thus denotes a PLB address, the initiator can directly read the content C1 using the returned PLB address PAL. If the IS_PLB flag=0 (e.g., is false or off) and thus denotes a VLB address, the initiator owns the VLB, VLB1, including the returned VLB address, V1. In this latter case the initiator node accesses VLB1 to read contents stored at the address, location or entry thereof denoted by the returned VLB address V1. In at least one embodiment, V1 can be an address or location of an entry or offset E1 within the VLB1, where E1 includes PAL. Thus, E1 of VLB1 can be accessed to read PA1, and the PA1 can be accessed by the initiator node to read the contents C1 stored at LA1. C1 can then be returned to the host or other client which issued the read I/O reading from LA1.

If the initiator node which receives the read I/O operation to read C1 from LA1 is the owner of LA1 and also the owner of the VLB, VLB1, included in the mapping information for LA1, the initiator node can perform all necessary resolution processing for LA1. In this case, the initiator node, which owns LA1 and VLB1, may not issue an RPC to its peer node. Rather, the VLB access to VLB1 is done locally on the owning initiator node.

In at least one embodiment, for a read I/O directed to logical address LA1, the node designated as the exclusive owner of LA1 can map LA1 to a corresponding VLB address, V1, where V1 is included in the mapping information for LA1. Additionally in at least one embodiment, the particular node designated as the exclusive owner with respect to a target VLB (which includes an entry E1 having the address V1) can map the VLB address V1 to a corresponding PLB address denoting a physical address or location PA1 containing the content C1 stored at LA1.

In this manner, the foregoing scenarios provide for efficient use of cache by having the VLB owning node perform mapper resolution processing with respect to a target logical address LA1 of a read I/O operation. As a result in such embodiments, the VLB can be read and accessed, and correspondingly cached, on only the owning node of the VLB but not the peer node. As a result of the foregoing scenarios in accordance with the techniques of the present disclosure, access and reading of a VLB by a non-owning node can be avoided in such scenarios, whereby the non-owning node with respect to a VLB can avoid caching the VLB which it does not own.

In at least one embodiment, an initiator node receiving a read I/O directed to the logical address LA1 can exclusively own LA1 but not exclusively own the target VLB included in the chain of MD pages of mapping information mapping LA1 to a corresponding PLB address PA1 containing content C1 stored at LA1. In at least one embodiment in this case, the initiator node can issue an RPC to the peer node which owns the target VLB, where the target VLB includes an entry E1, where E1 includes the corresponding PLB address PAL. The peer node owning the target VLB can access and read its entry E1 thereby reading PA1 from E1. The peer node can then return PA1 in response to the RPC. After the initiator node receives the RPC response from the peer node which owns the target VLB, the initiator node can access PA1 and read the content C1, and then return C1 to the host or other client which issued the read I/O.

In at least one embodiment, an initiator node receiving a read I/O directed to the logical address LA1 can exclusively own LA1 but not own the target VLB included in the chain of MD pages of mapping information mapping LA1 to a corresponding PLB address PA1 containing content C1 stored at LA1. In at least one embodiment, one of multiple options can be selected in order to access the target VLB and obtain PA1 from a corresponding entry E1 of the target VLB. In at least one embodiment, one or more of the multiple options can include relaxation or removal of some of the restrictions resulting from exclusive VLB ownership. In particular, the second and third options noted below and discussed elsewhere herein provide for a relaxation or removal of some of the restrictions of exclusive VLB ownership whereby the non-owning VLB node can be allowed to limited access and/or caching of a VLB which it does not own. In at least one embodiment, such limited access and/or caching by a non-owning node with respect to a target VLB can be performed in connection with a limited usage case or scenario where the initiator node receives the read I/O directed to LA1 and exclusively owns LA1 but where the peer node owns the target VLB of the mapping information mapping LA1 to its corresponding PLB address PA1 containing content C1 stored at LA1.

In at least one embodiment, the multiple options can include a first, second and third option. The first option can include issuing an RPC as noted above to the peer node which owns the target VLB. The second option can include the initiator node (which does not own the target VLB) reading the target VLB, such as from a corresponding location on non-volatile BE storage; and then reading PA1 from the corresponding entry E1 of the target VLB. In this second option, the target VLB read locally by the non-owning initiator node from BE non-volatile storage may not be cached by the non-owning initiator node. The third option can include the initiator node (which does not own the target VLB) reading the target VLB, such as from a corresponding location on non-volatile BE storage; and then reading PA1 from the corresponding entry E1 of the target VLB. In this third option, the target VLB read locally by the non-owning initiator node from BE non-volatile storage can be cached by the non-owning initiator node. With this third option in at least one embodiment, the initiator node can have a relatively small local cache of un-owned VLBs (e.g., VLBs which are exclusively owned by the peer node but not the initiator node). With this third option in at least one embodiment, the small local cache of un-owned VLBs can include hot or frequently accessed VLBs which are owned by the peer node.

In at least one embodiment including the three options noted above, one or more criteria can be specified to provide for dynamically selecting one of the three options at runtime in accordance with the current evaluation of the one or more criteria. In at least one embodiment, the one or more criteria can include one or more metrics. In at least one embodiment, the one or more criteria can include the latency introduced if the RPC of the first option is performed. The latency can be determined in any suitable manner. In at least one embodiment, the latency can be estimated based on prior actual issuances of the RPC of the first option alone, or in combination with, current utilization or data traffic of an internode link or connection between the initiator and peer nodes where the RPC would be issued over the internode link or connection. Generally, the higher the latency and/or the higher the internode link utilization, the more motivation to select another option other than the first option. In at least one embodiment, the one or more criteria can include a VLB cache hit rate with respect to the peer node which owns the target VLB. Generally, the higher the VLB cache hit rate of the owning node of the target VLB, the greater the motivation to send the RPC request by selecting the first option rather than reading the target VLB locally from BE non-volatile storage (as with the second or third options). In at least one embodiment, the one or more criteria can include a current utilization of BE non-volatile storage. Generally, the higher the BE utilization, the greater the motivation to send the RPC request by selecting the first option rather than selecting the second or third options which read the target VLB locally from BE non-volatile storage. In at least one embodiment, the one or more criteria can include a local VLB cache hit rate of the initiator node if a local VLB cache is used to cache VLB pages not owned by the initiator node. Generally, the higher the local VLB cache hit rate, the more motivation to use the local VLB cache and not send an RPC request (e.g., not select the first option but rather select the above-noted second or third option which is performed locally on the initiator node which received the read I/O operation).

In at least one embodiment, the criteria can indicate to select the first option and send a peer RPC request if the latency is less than a specified maximum latency threshold, if the VLB cache hit rate of the peer node is above a specified hit rate threshold, and if the BE utilization is greater than a specified utilization threshold.

In at least one embodiment, the criteria can indicate to select the first option to send a peer RPC request if the latency is less than a specified maximum latency threshold, and if the VLB cache hit rate of the peer node is above a specified hit rate threshold.

In at least one embodiment, the criteria can indicate to select the first option to send a peer RPC request if the latency is less than a specified maximum latency threshold, and if the BE utilization is greater than a specified utilization threshold.

In at least one embodiment, the criteria can indicate to select the second or third option (and not send a peer RPC request) if the latency is more than a specified maximum latency threshold, and/or if the internode link utilization is greater than a specified utilization threshold.

In at least one embodiment, the criteria can include a function F which includes one or more independent variables used to make a selection provided as an output of the function F. The one more independent variables can include one or more of: the latency introduced if the RPC of the first option is performed; current utilization of an internode link or connection between the initiator and peer nodes where the RPC would be issued over the internode link or connection; a VLB cache hit rate with respect to the peer node which owns the target VLB; a current utilization of BE non-volatile storage; and a local VLB cache hit rate of the initiator node if a local VLB cache is used to cache VLB pages not owned by the initiator node. Generally, the function F can make a selection from multiple specified or predefined options such as discussed above. In at least one embodiment, F can be used to select one of the specified options in accordance with a weighting of the multiple independent variables.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14*a*-14*n* through the communication medium 18. In this embodiment of the SAN 10, the n hosts 14*a*-14*n* access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14*a*-14*n* access and communicate with the data storage system 12, and also communicate with other components included in the SAN 10.

Each of the host systems 14*a*-14*n* and the data storage system 12 included in the SAN 10 are connected to the communication medium 18 by any one of a variety of connections as provided and supported in accordance with the type of communication medium 18. The processors included in the host systems 14*a*-14*n* and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14*a*-14*n* and the data storage system 12 can all be located at the same physical site, or, alternatively, be located in different physical locations. The communication medium 18 used for communication between the host systems 14*a*-14*n* and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14*a*-14*n* and the data storage system 12 are connected to the communication medium 18 can pass through other communication devices, such as switching equipment, a phone line, a repeater, a multiplexer or even a satellite.

Each of the host systems 14*a*-14*n* can perform data operations. In the embodiment of the FIG. 1, any one of the host computers 14*a*-14*n* issues a data request to the data storage system 12 to perform a data operation. For example, an application executing on one of the host computers 14*a*-14*n* performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16*a*-16*n*. The data storage devices 16*a*-16*n* include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14*a-n*. In at least one embodiment, the data storage array or system includes one or more RAs used, for example, to facilitate communications between data storage arrays. The data storage array also includes one or more device interfaces 23 for facilitating data transfers to/from the data storage devices 16*a*-16*n*. The data storage device interfaces 23 include device interface modules, for example, one or more disk adapters (DAs) (e.g., disk controllers) for interfacing with the flash drives or other physical storage devices (e.g., PDS 16*a-n*). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25*b* is used to facilitate data transfers and other communications between the device interfaces, the HAs and/or the RAs in a data storage array. In one embodiment, the device interfaces 23 performs data operations using a system cache included in the global memory 25*b*, for example, when communicating with other device interfaces and other components of the data storage array. The other portion 25*a* is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14*a*-14*n* provide data and access control information through channels to the storage systems 12, and the storage systems 12 also provide data to the host systems 14*a-n* also through the channels. The host systems 14*a-n* do not address the drives or devices 16*a*-16*n* of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s)

residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22*a* used to manage and monitor the data storage system 12. In one embodiment, the management system 22*a* is a computer system which includes data storage system management software or application that executes in a web browser. A data storage system manager can, for example, view information about a current data storage configuration such as LUNs, storage pools, and the like, on a user interface (UI) in a display device of the management system 22*a*. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16*a*-16*n*. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22*a* to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22*a* to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
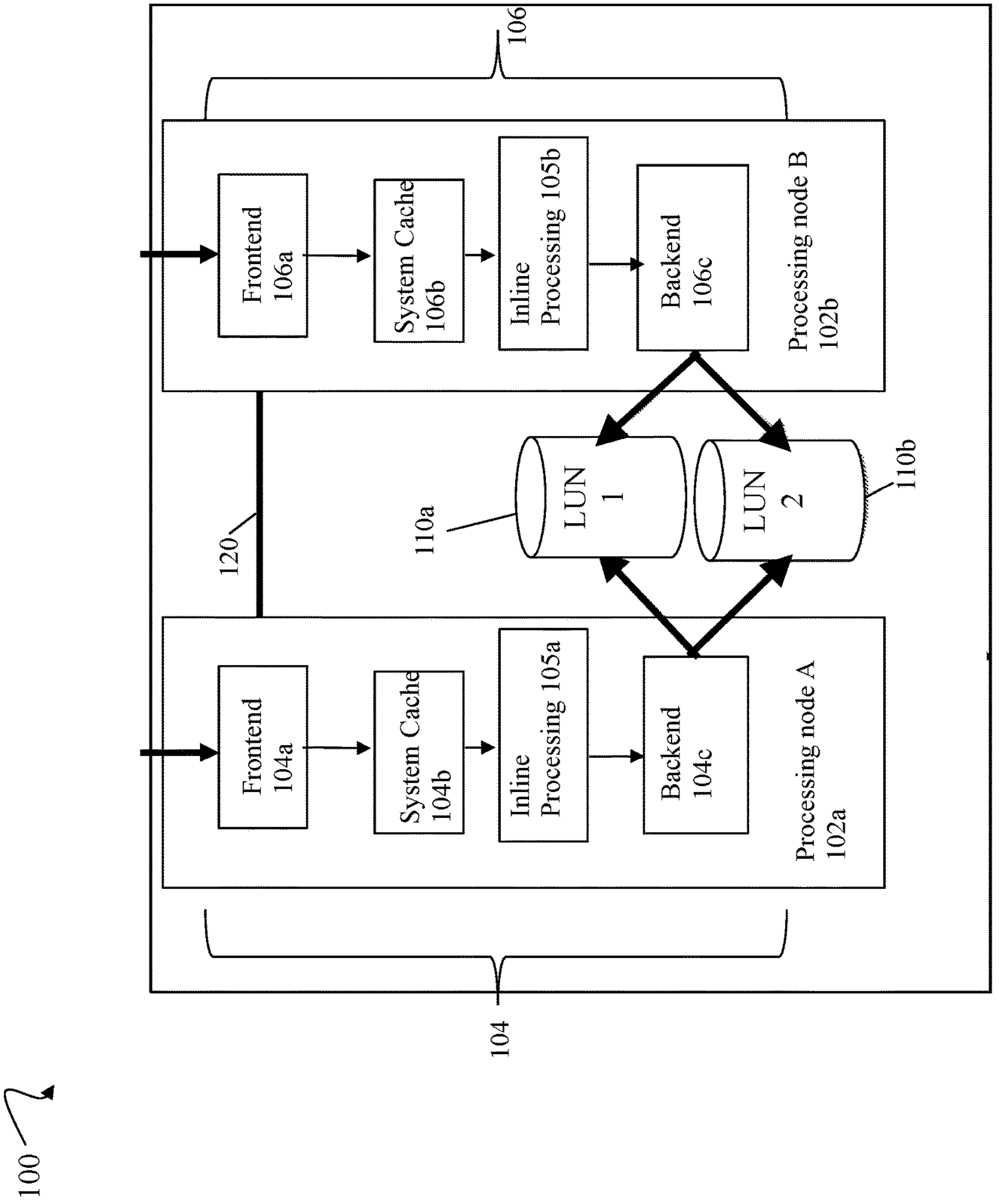
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102*a* and B 102*b* and the associated software stacks 104, 106 of the data path, where I/O requests can be received by either processing node 102*a* or 102*b*. In the example 200, the data path 104 of processing node A 102*a* includes: the frontend (FE) component 104*a* (e.g., an FA or front end adapter) that translates the protocol-specific request into a storage system-specific request; a system cache layer 104*b* where data is temporarily stored; an inline processing layer 105*a*; and a backend (BE) component 104*c* that facilitates movement of the data between the system cache and non-volatile physical storage (e.g., back end physical non-volatile storage devices or PDs accessed by BE components such as DAs as described herein). During movement of data in and out of the system cache layer 104*b* (e.g., such as in connection with read data from, and writing data to, physical storage 110*a*, 110*b*), inline processing can be performed by layer 105*a*. Such inline processing operations of 105*a* can be optionally performed and can include any one of more data processing operations in connection with data that is flushed from system cache layer 104*b* to the back-end non-volatile physical storage 110*a*, 110*b*, as well as when retrieving data from the back-end non-volatile physical storage 110*a*, 110*b* to be stored in the system cache layer 104*b*. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102*b* has its own FE component 106*a*, system cache layer 106*b*, inline processing layer 105*b*, and BE component 106*c* that are respectively similar to the components 104*a*, 104*b*, 105*a* and 104*c*. The elements 110*a*, 110*b* denote the non-volatile BE physical storage provisioned from PDs for the LUNs, whereby an I/O can be directed to a location or logical address of a LUN and where data can be read from, or written to, the logical address. The LUNs 110*a*, 110*b* are examples of storage objects representing logical storage entities included in an existing data storage system configuration. Since, in this example, writes, or more generally I/Os, directed to the LUNs 110*a*, 110*b* can be received for processing by either of the nodes 102*a* and 102*b*, the example 100 illustrates what can also be referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110*a*, 110*b* by the BE component 104*c*. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2A is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a-b* in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
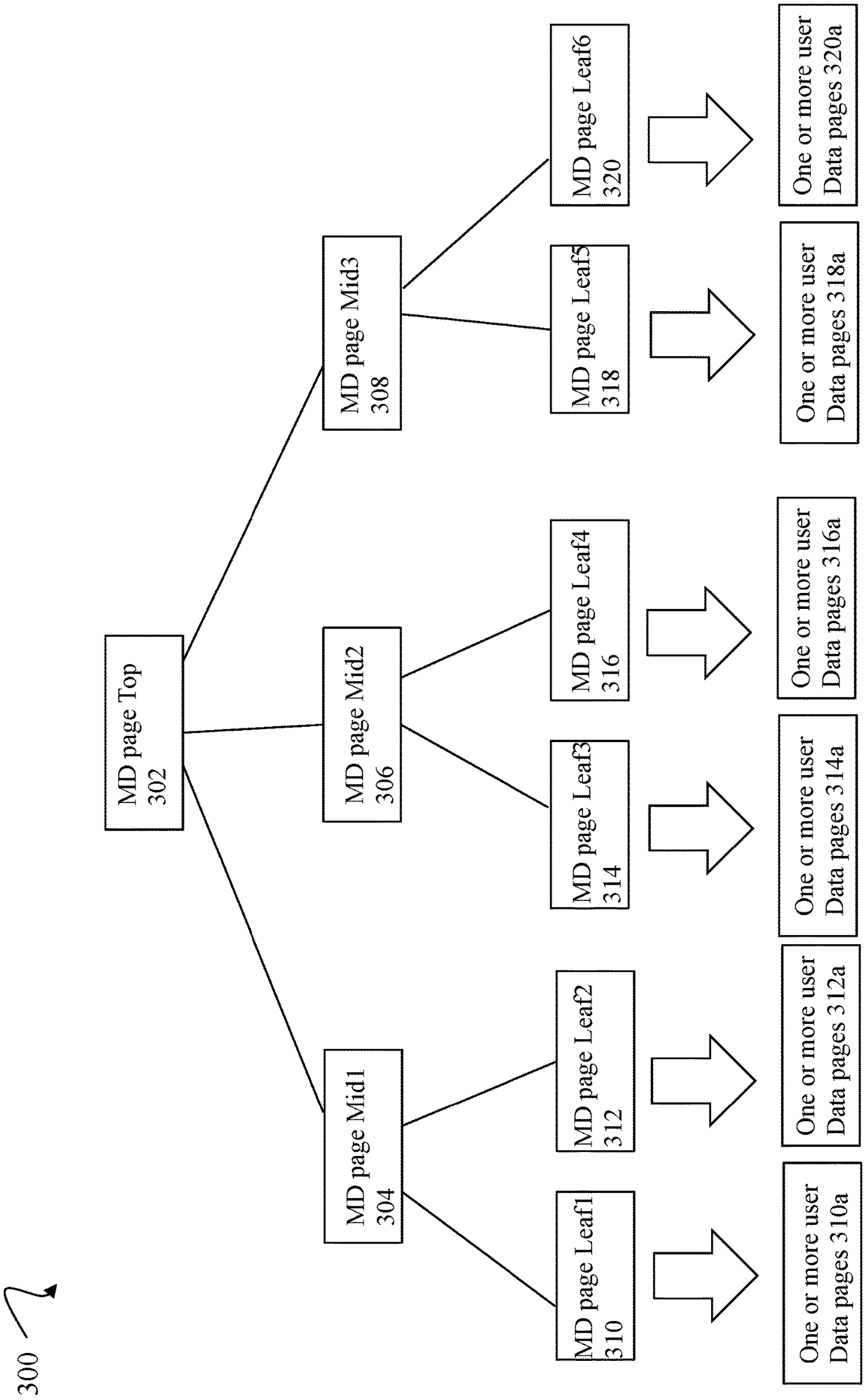
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
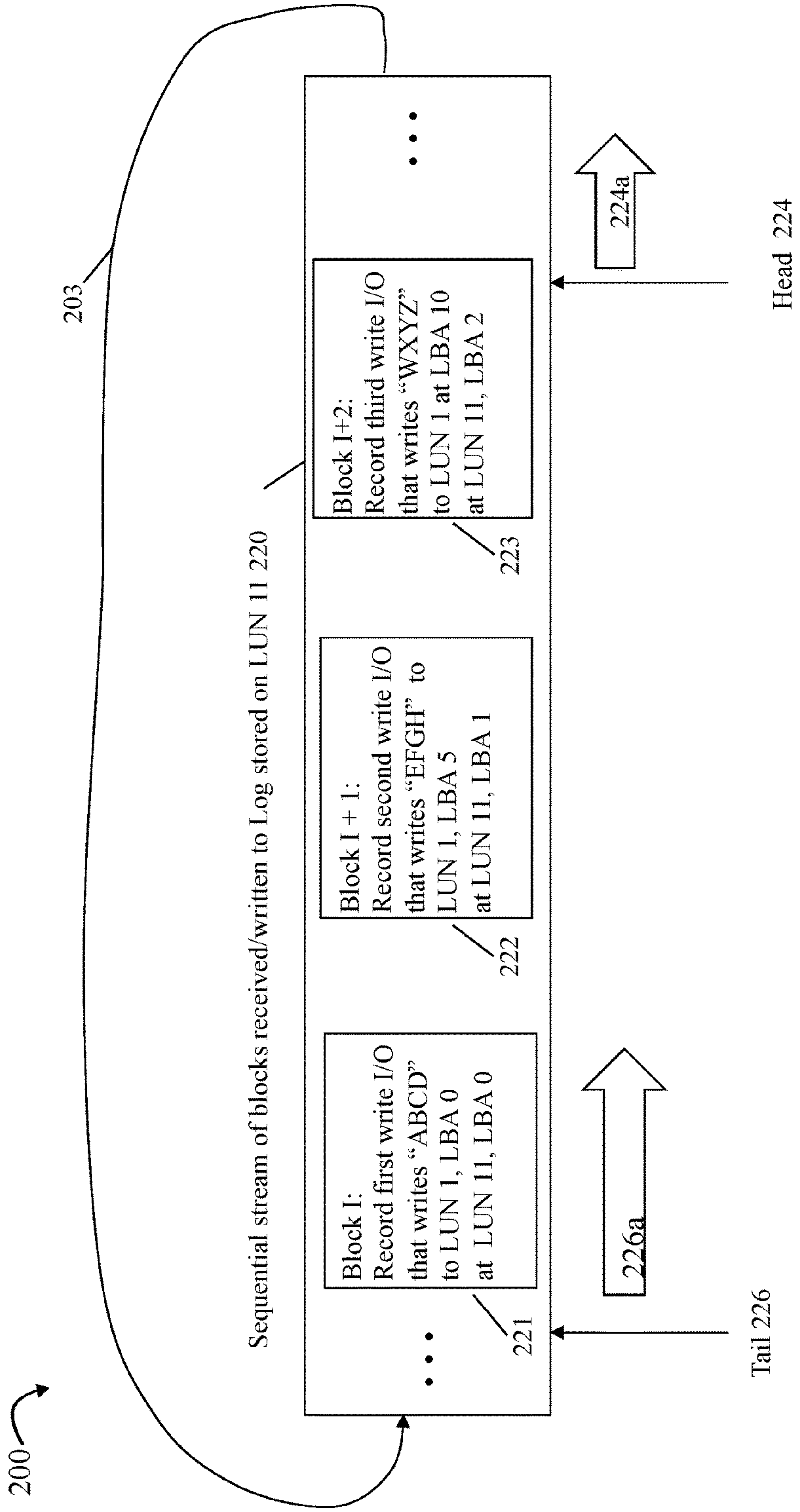
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224*a* to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226*a* sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
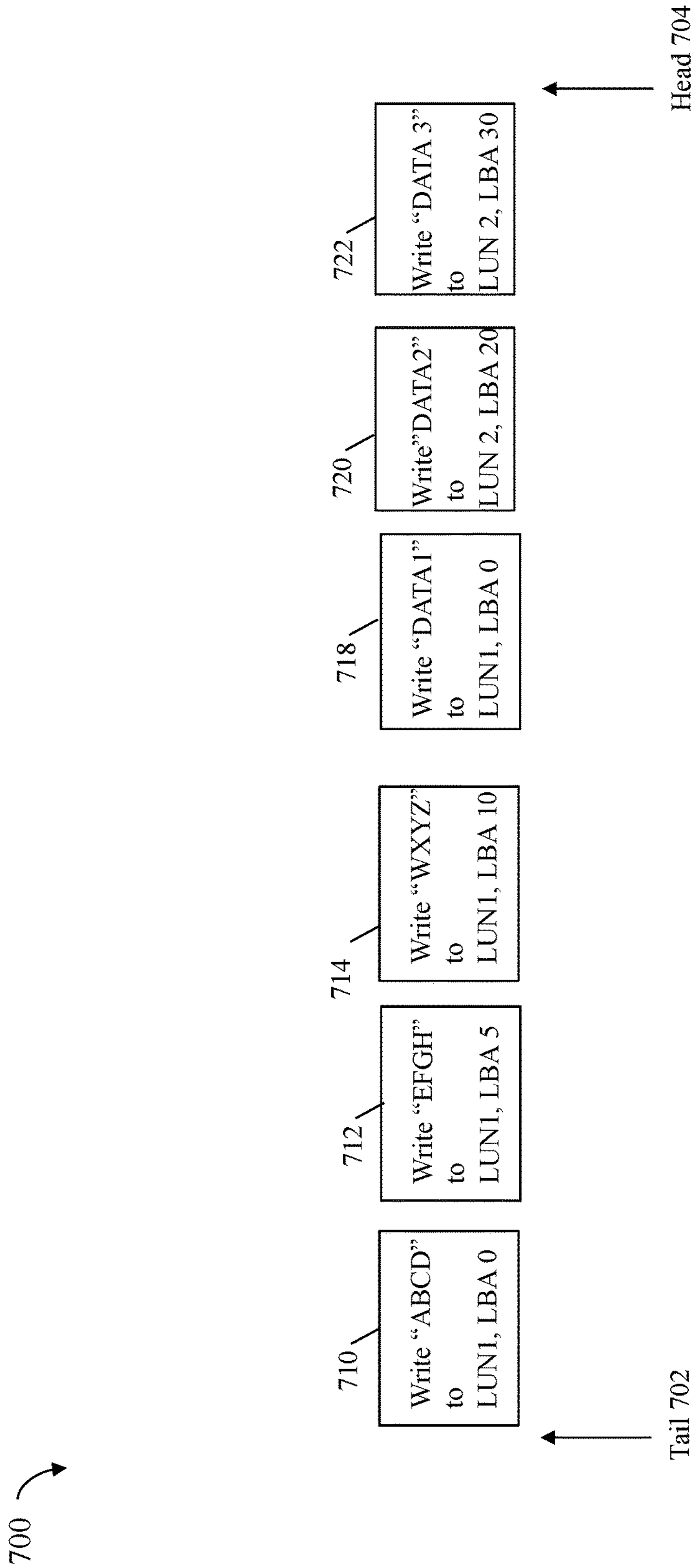

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
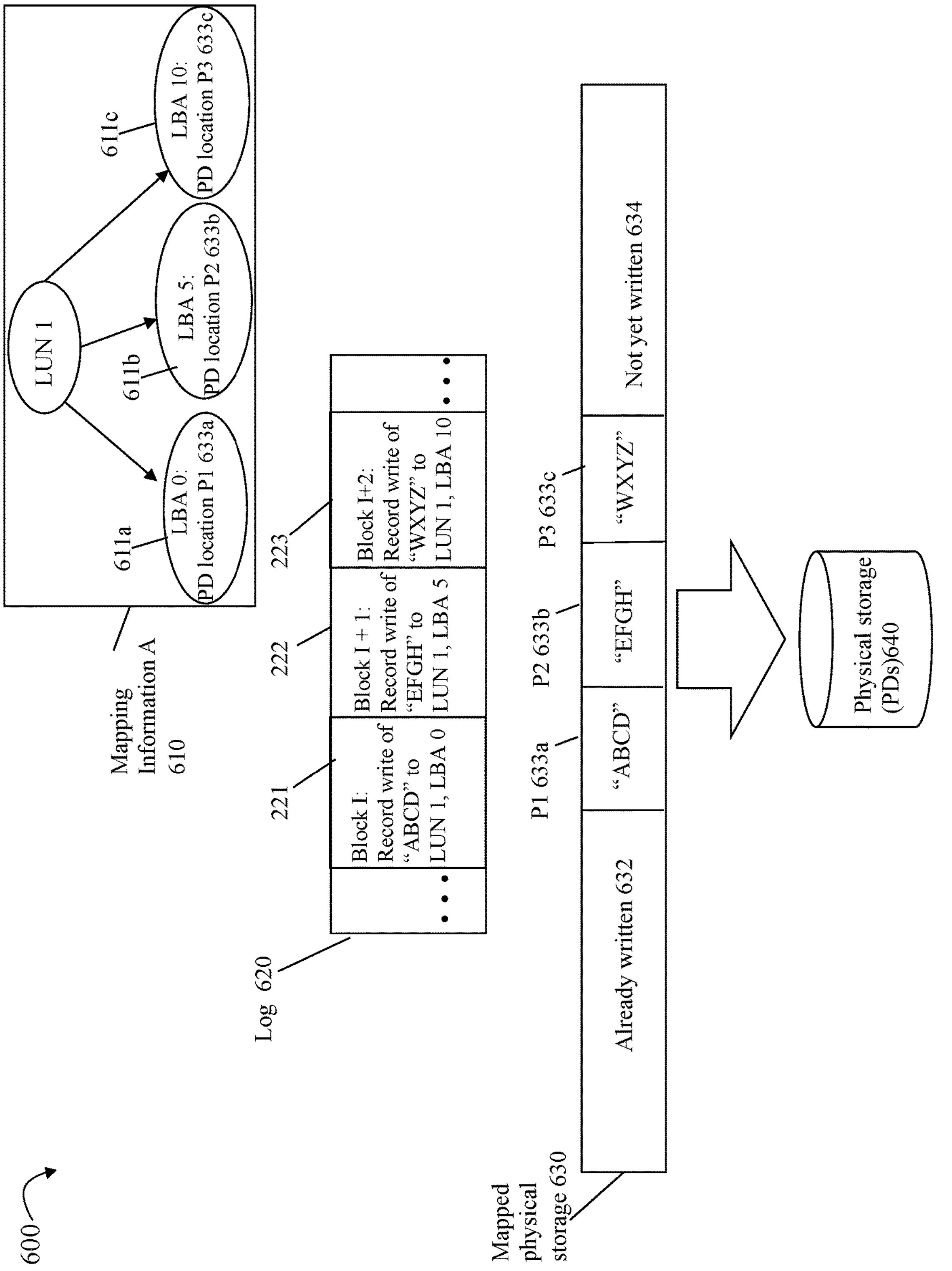

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611*a-c* denoting the mapping information, respectively, for the 3 target logical address of the 3 recorded write I/O operations in the log records 221, 222, and 223. The element 611*a* of the mapping information denotes the mapping information for the target logical address LUN1, LBA 0 of the block 221 of the log 620. In particular, the block 221 and mapping information 611*a* indicate that the user data "ABCD" written to LUN 1, LBA 0 is stored at the physical location (PD location) P1 633*a* on the physical storage 640. The element 611*b* of the mapping information denotes the mapping information for the target logical address LUN1, LBA 5 of the block 222 of the log 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633*a*, 633*b*, 633*c* and 634. The element 632 denotes the physical locations of the user data written and stored on the BE PDs for the log records processed prior to the block or record 221. The element 633*a* denotes the PD location P1 of the user data "ABCD" stored at LUN 1, LBA 1. The element 633*b* denotes the PD location P2 of the user data "EFGH" stored at LUN 1, LBA 5. The element 633*c* denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310*a*, 312*a*, 314*a*, 316*a*, 318*a* and 320*a*.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312*a*. In order to access UD page X of 312*a*, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310*a*, 312*a*, 314*a*, 316*a*, 318*a* and 320*a* include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310*a*, 312*a*, 314*a*, 316*a*, 318*a* and 320 each include user data stored on particular logical addresses of the LUN A's logical address space. It may be, for example, that element 310*a* includes user data stored at a first set of LBAs 0-511; and that element 312*a* includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310*a* denotes data pages for LBAs 0-511; the element 312*a* denotes data pages for the LBAs 512-1023; the element 314*a* denotes data pages for LBAs 1024-1535; the element 316*a* denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310*a* denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310*a*.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
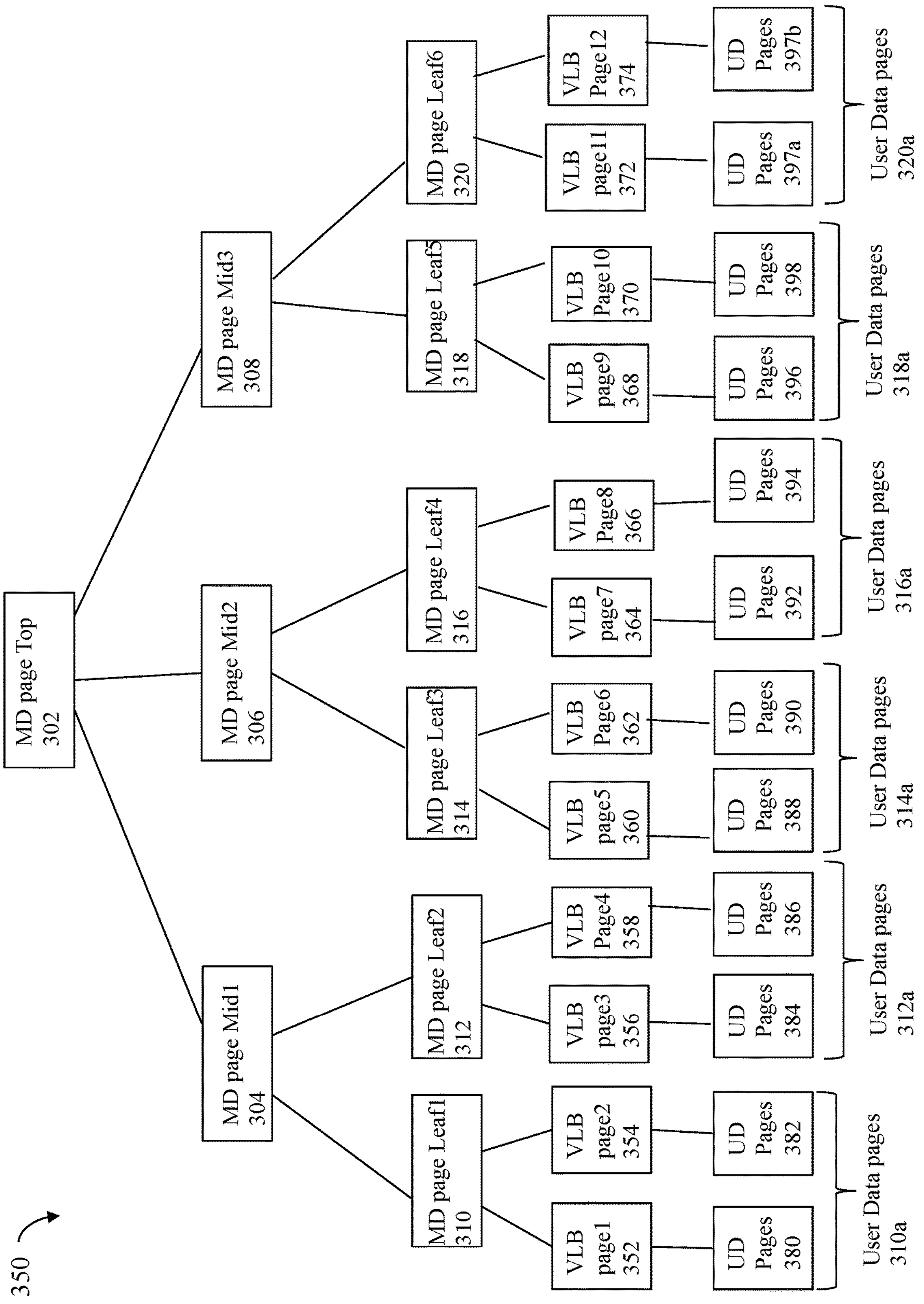

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310*a* of FIG. 3 including data for LBAs 0-511. The UD pages 384 and 386 denote two portions of UD pages corresponding to UD pages 312*a* of FIG. 3 including data for LBAs 512-1023. The UD pages 388 and 390 denote two portions of UD pages corresponding to UD pages 314*a* of FIG. 3 including data for LBAs 1024-1535. The UD pages 392 and 394 denote two portions of UD pages corresponding to UD pages 316*a* of FIG. 3 including data for LBAs 1536-2047. The UD pages 396 and 398 denote two portions of UD pages corresponding to UD pages 318*a* of FIG. 3 including data for LBAs 2048-2559. The UD pages 397*a* and 397*b* denote two portions of UD pages corresponding to UD pages 320*a* of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
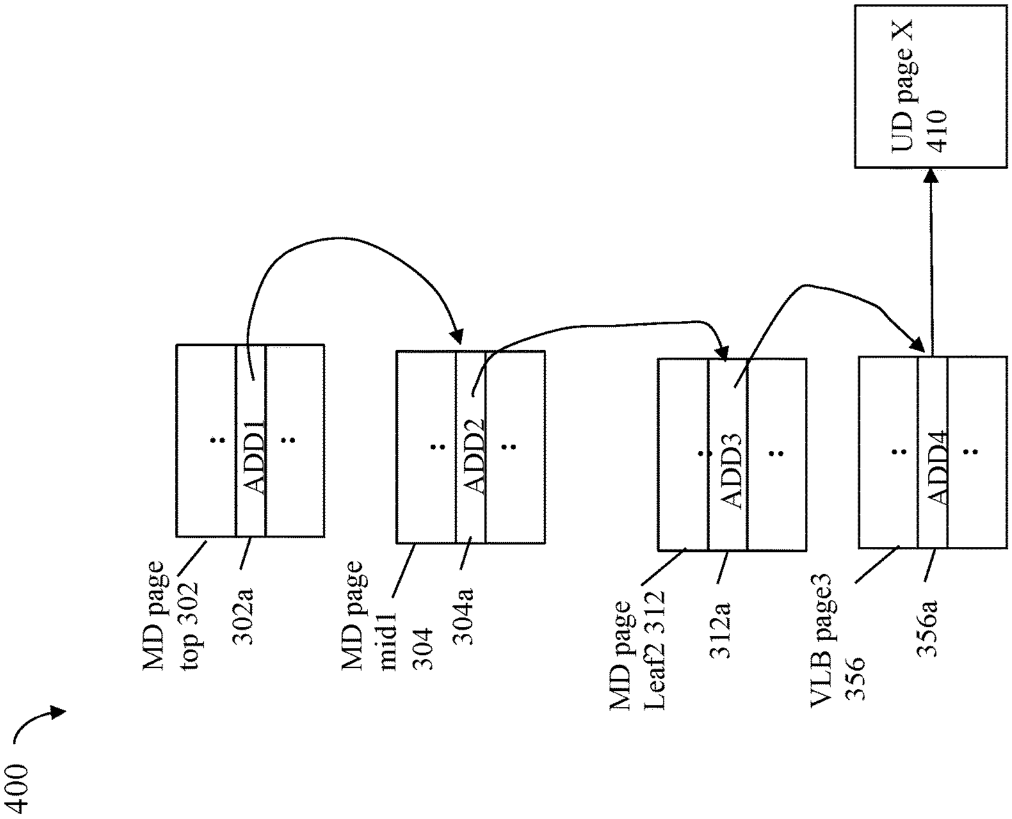

Referring to FIG. 5, shown is a more detailed representation 400 of the MD pages of the sequence traversed to access the UD page X 384 included in the set of UD pages 312*a*. As noted above, the MD page sequence includes MD page 302, MD page 304, MD page 312, and VLB page3 356. In the example 400, MD page top 302 includes an entry or address 302*a* that points to or references the location 304*a* in the MD page mid1 304. In at least one embodiment, the starting entry 302*a* in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302*a* having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302*a*. If the MD page 302 is already in cache, the cached copy can be used to obtain the address or pointer ADD1 from the location 302*a*. The address or pointer ADD1 of location 302*a* can then be used to identify the entry 304*a* of the particular mid level MD page, such as MD page mid1 304, that is accessed next in the sequence.

Continuing with the example 400, the MD page mid1 304 can be accessed where the location 304*a* is read to obtain the address or pointer ADD2 from location 304*a*. The address or pointer ADD2 can then be used to identify the entry 312*a* of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304*a*. The address or pointer ADD2 identifies location 312*a* of the MD page leaf 2 312. If the MD page 312 is not already in cache, the on-disk copy of the MD page 312 on a PD can be read to obtain the content of location 312*a*. The location 312*a* of the MD page leaf2 312 can be accessed and read to obtain the address or pointer ADD3 from location 312*a*. The address or pointer ADD3 can then be used to identify a particular entry of a VLB page, such as the entry 356*a* of the VLB page3 356, that is next accessed in the sequence. Thus, ADD3 can denote the location or address of the entry 356*a* in the VLB page 3 356.

If the VLB page 356 is not already in cache, the on-disk copy of the VLB page 356 on a PD can be read to obtain the content of location 356*a*. The location 356*a* of the VLB page 3 356 can be accessed and read to obtain the address or pointer ADD4 from the location 356*a*. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
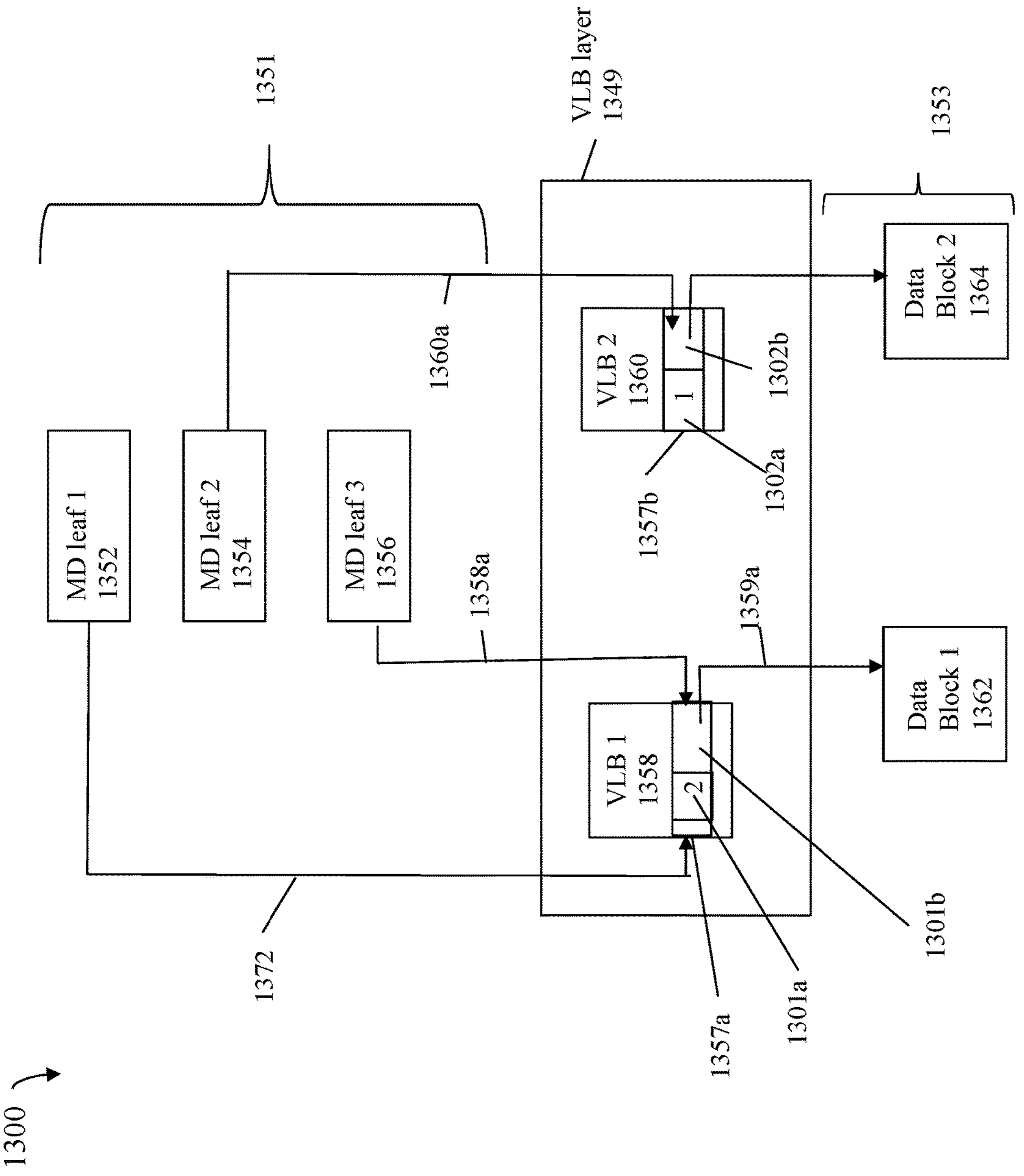

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357*a* of the VLB 1358. The two MD leaf nodes 1352 and 1356 both referencing the same data block 1362 indirectly through use of the same VLB entry 1357*a* can be a mapping resulting from data deduplication processing. In the example 1300, MD leaf node 1354 points to the entry 1357*b* of the VLB 1360 whereby the entry 1357*b* of the VLB2 1360 then further references or points to the data block 1364. The data blocks 1362, 1364 can denote user data blocks as described herein.

The element 1358*a* denotes a pointer to, or address of, the entry 1357*a* in the VLB 1358 used in connection with obtaining the data block 1362 stored on a particular LUN and LBA of the LUN. The pointer 1358*a* can be used as the virtual or indirect pointer in connection with obtaining the data block 1362. In at least one embodiment, the VLB 1358 can be a VLB page or node as described herein. Thus, in such an embodiment, the virtual or indirect pointer 1358*a* can be a pointer to the entry 1357*a* of the VLB structure 1358, where the entry 1357*a* can further include fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1372 denotes a pointer to, or address of, the entry 1357*a* in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357*a* of the VLB structure 1358, where the entry 1357*a* can further include the fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1360*a* denotes a pointer to, or address of, the entry 1357*b* in the VLB 1360 used in connection with obtaining the data block 1364 stored on a particular LUN and LBA of the LUN. The pointer 1360*a* can be used as the virtual or indirect pointer in connection with obtaining the data block 1364. Thus, in such an embodiment, the virtual or indirect pointer 1360*a* can be a pointer to the entry 1357*b* of the VLB structure 1360, where the entry 1357*b* can further include the fields 1302*a* and 1302*b*. The field 1302*b* can be a pointer to, or address of, the user data block 1364. The field

1302*a* can be a reference count or counter indicating the number of instances of, or references to, the particular data block 1362 (e.g., data block pointed to by 1302*b*).

The reference count 1301*a* can be initialized to 1 when a first or initial instance of the associated data block 1362 is stored. In this example, the reference 1301*a* is 2 indicating that there are 2 instances of the data block 1362 and thus 2 references to the data block 1362. In this case, the are 2 instances of the data block 1362 in stored user data. The instances denoted by the reference count 1301*a* include all deduplicated instances corresponding to entries of the MDL leaves 1352, 1356 that respectively point 1372, 1358*a* to the VLB entry 1357*a* associated with the single copy of the data block 1362.

The reference count 1302*a* can be initialized to 1 when a first or initial instance of the associated data block 1364 is stored. In this example, the reference 1302*a* is 1 indicating that there is 1 instance of the data block 1364 and thus 1 reference to the data block 1364. The instances denoted by the reference count 1302*a* generally include any/all deduplicated instances associated with the single copy of the data block 1364. However, in this example, there is only a single reference to, and single instance of, the data block 1364 in stored user data. In particular, the MD leaf 1354 references or points (1360*a*) to the VLB entry 1357*b* associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

In at least one embodiment, each MD leaf can have multiple entries, such as 512 entries, each corresponding to a different logical address in a logical address range corresponding to the MD leaf.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

Workflows for some implementations to perform reads and writes to the MD page can include loading the entire MD page into the cache or volatile memory of a node, if the MD page is not already in the cache or volatile memory of the node.

A data storage system can perform different data services such as data deduplication discussed above to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6 and discussion above regarding FIG. 6. In at least one embodiment using the MD structures as described, for example, in connection with FIGS. 3, 4, 5, and 6, the reference count associated with a data block can be included in an entry of a VLB page associated with the data block. For example with reference to FIG. 6, the VLB entry 1357*a* includes a field 1301*a* with the reference count=2 for the associated data block 1362; and the VLB entry 1357*b* includes a field 1301*a* with the reference count=1 for the associated data block 1364.

The reference count such as of the VLB entries 1357*a*, 1357*b*, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy of the data block.

Consistent with other discussion herein in at least one embodiment, updates or modifications can be with respect to user data or stored content modified by client or host write I/Os as well as with respect to metadata, such as updates or modifications to the MD structure or mapping information described above. As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing.

Garbage collection can be performed in connection with storage management of the BE PDs to reclaim and reuse free or invalidated physical storage as new data is written. In some cases, "holes" of storage storing old, unused or invalid content can be interspersed among portions of storage storing current valid content. Garbage collection can include performing processing which allows multiple holes of storage including unused or invalid data to be compacted into a single larger contiguous storage portion which can then be reused. Thus garbage collection processing can include moving first storage portions of valid data or content interspersed among holes of invalid content from a source to a target location to thereby make free or available a larger contiguous storage portion including the holes of invalid content.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the UD log can include updating the corresponding MD pages which map the logical address to its corresponding BE PD location including the content stored at the logical address. In at least one existing system, the mapping information including MD pages as described herein can thus be updated. For example, such updating of the mapping information can include updating any of the top, mid and leaf MD pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, and leaf MD page.

Described below are techniques of the present disclosure which provide for improved and efficient cache usage.

In at least one embodiment, the techniques of the present disclosure provide for assigning ownership of the VLBs of the virtual layer among the multiple nodes of the system. In at least one embodiment, the VLBs of the virtual layer can be partitioned into multiple sets, where exclusive ownership of one of the multiple sets of VLBs is assigned to a corresponding one of the multiple nodes. In at least one embodiment, exclusive ownership of each VLB can be assigned to a single one of the nodes.

In at least one embodiment, a node which receives an I/O operation can be referred to as the initiator node with respect to that particular I/O operation.

In at least one embodiment, exclusive ownership, such as with respect to a portion of logical address space as well as a VLB or other metadata portion may include a strong ownership or include the exclusive locking by a particular node, where such ownership is not shared with another node. In at least one embodiment, a storage node assigned exclusive ownership over a logical address or a metadata portion does not yield access to that logical address or metadata portion to another node.

In at least one embodiment, an architecture can be utilized which partitions ownership of the logical address space of user data or content among the multiple processing nodes. In at least one embodiment, a node assigned a particular logical address can be designated as the exclusive owner of the logical address. If the node receives an I/O directed to a logical address not owned by the node, the receiving node can forward or redirect the I/O for servicing or processing to the owning node. In at least one embodiment, the I/Os can include read I/Os. For a read I/O directed to a target logical address LA1 where the read I/O is received by an initiator node which does not own LA1, the initiator node can issue a remote procedure call (RPC) to its peer node to service the read, where the peer node owns LA1. In at least one embodiment, the RPC for the read I/O can be a request from the initiator node to a peer node (owner of LA1) to perform processing in connection with MD pages of mapping information for LA1. In particular, the RPC for the read I/O can be a request for the peer node (which owns the logical address LA1) to perform mapping resolution processing for LA1. The resolution processing can include mapping LA1 to a corresponding VLB address or physical layer block (PLB) address. The resolution processing can be in accordance with the chain of MD pages of mapping information for LA1. The resolution processing can include traversing one or more of the MD pages of the chain of mapping information for LA1. The VLB address can be a location or address of an offset or entry of a VLB included in the chain of MD pages of mapping information used to map LA1 to a corresponding PLB address. The PLB address can be a physical location or address of a PLB (or physical location or address within a PLB) including the content C1 stored at LA1. Thus, the VLB address can be an indirect pointer or address used to indirectly access the content C1 stored at LA1. The PLB address can be a pointer to, or address of, a physical storage location on BE non-volatile storage, where the physical storage location contains the content C1 stored at LA1.

In at least one embodiment, the peer node, which owns LA1 and receives the RPC from the initiator node, can return either a VLB address V1 or a PLB address PAL. In at least one embodiment, the peer node can return a PLB address if the peer node is the exclusive owner of the VLB, VLB1, where V1 is an address or offset of an entry within VLB1, where V1 is included in the mapping information used to map LA1 to PA1, and where PA1 is the physical address or location of C1 stored at LAL. If the peer node receiving the RPC owns LA1 and also owns VLB1 including V1, the peer node continues performing additional resolution processing using V1. In particular, V1 can denote an address, offset or location of an entry E1 within VLB1, where E1 includes the PLB address PAL. In this manner, the resolution processing can include mapping LA1 to V1, and then reading the contents stored at V1 (e.g., the contents stored at entry E1 of VLB1), where PA1 is the contents stored at V1.

In at least one embodiment, the peer node receiving the RPC can return the VLB address V1 if the peer node is not the exclusive owner of the VLB, VLB1, where VLB1 includes the VLB address V1, where V1 is included in the mapping information used to map LA1 to PA1, and where PA1 is the physical address or location of C1 stored at LA1. In connection with the foregoing case, V1 is the address of an entry E1 in VLB1 where PA1 is included in the entry E1 of VLB1. If the peer node receiving the RPC owns LA1 but does not own VLB1 including V1, the peer node can simply return V1 (an address or pointer to the entry E1 of VLB1) without performing the additional resolution processing noted above.

In at least one embodiment, in response to the RPC, the peer node owning LA1 can return information including either the VLB address V1 or the PLB address PA1 depending on whether the peer node owns VLB1 which includes a corresponding entry, location or address denoted by V1. In such an embodiment, the flag IS_PLB can be included in an RPC response or reply sent from the peer node to the initiator node, where the initiator node sent the RPC. The IS_PLB flag can denote the address or pointer type returned as either a VLB address type or a PLB address type. The initiator node can then examine the IS_PLB flag to interpret the returned address as either a VLB address or a PLB address. If the IS_PLB flag=1 (e.g., is true or on) and thus denotes a PLB address, the initiator can directly read the content C1 using the returned PLB address PAL. If the IS_PLB flag=0 (e.g., is false or off) and thus denotes a VLB address, the initiator owns the VLB, VLB1, including the returned VLB address, V1. In this latter case the initiator node accesses VLB1 to read contents stored at the address, location or entry thereof denoted by the returned VLB address V1. In at least one embodiment, V1 can be an address or location of an entry or offset E1 within the VLB1, where E1 includes PAL. Thus, E1 of VLB1 can be accessed to read PA1, and the PA1 can be accessed by the initiator node to read the contents C1 stored at LA1. C1 can then be returned to the host or other client which issued the read I/O reading from LA1.

If the initiator node which receives the read I/O operation to read C1 from LA1 is the owner of LA1 and also the owner of the VLB, VLB1, included in the mapping information for LA1, the initiator node can perform all necessary resolution processing for LA1. In this case, the initiator node, which owns LA1 and VLB1, may not issue an RPC to its peer node. Rather, the VLB access to VLB1 is done locally on the owning initiator node.

In at least one embodiment, for a read I/O directed to logical address LA1, the node designated as the exclusive owner of LA1 can map LA1 to a corresponding VLB address, V1, where V1 is included in the mapping information for LA1. Additionally in at least one embodiment, the particular node designated as the exclusive owner with respect to a target VLB (which includes an entry E1 having the address V1) can map the VLB address V1 to a corresponding PLB address denoting a physical address or location PA1 containing the content C1 stored at LA1.

In this manner, the foregoing scenarios provide for efficient use of cache by having the VLB owning node perform mapper resolution processing with respect to a target logical address LA1 of a read I/O operation. As a result in such embodiments, the VLB can be read and accessed, and correspondingly cached, on only the owning node of the VLB but not the peer node. As a result of the foregoing scenarios in accordance with the techniques of the present disclosure, access and reading of a VLB by a non-owning node can be avoided in such scenarios, whereby the non-owning node with respect to a VLB can avoid caching the VLB which it does not own.

In at least one embodiment, an initiator node receiving a read I/O directed to the logical address LA1 can exclusively own LA1 but not exclusively own the target VLB included in the chain of MD pages of mapping information mapping LA1 to a corresponding PLB address PA1 containing content C1 stored at LA1. In at least one embodiment in this case, the initiator node can issue an RPC to the peer node which owns the target VLB, where the target VLB includes an entry E1, where E1 includes the corresponding PLB address PAL. The peer node owning the target VLB can access and read its entry E1 thereby reading PA1 from E1. The peer node can then return PA1 in response to the RPC. After the initiator node receives the RPC response from the peer node which owns the target VLB, the initiator node can access PA1 and read the content C1, and then return C1 to the host or other client which issued the read I/O.

In at least one embodiment, an initiator node receiving a read I/O directed to the logical address LA1 can exclusively own LA1 but not own the target VLB included in the chain of MD pages of mapping information mapping LA1 to a corresponding PLB address PA1 containing content C1 stored at LA1. In at least one embodiment, one of multiple options can be selected in order to access the target VLB and obtain PA1 from a corresponding entry E1 of the target VLB. In at least one embodiment, one or more of the multiple options can include relaxation or removal of some of the restrictions resulting from exclusive VLB ownership. In particular, the second and third options noted below and discussed elsewhere herein provide for a relaxation or removal of some of the restrictions of exclusive VLB ownership whereby the non-owning VLB node can be allowed to limited access and/or caching of a VLB which it does not own. In at least one embodiment, such limited access and/or caching by a non-owning node with respect to a target VLB can be performed in connection with a limited usage case or scenario where the initiator node receives the read I/O directed to LA1 and exclusively owns LA1 but where the peer node owns the target VLB of the mapping information mapping LA1 to its corresponding PLB address PA1 containing content C1 stored at LA1.

In at least one embodiment, the multiple options can include a first, second and third option. The first option can include issuing an RPC as noted above to the peer node which owns the target VLB. The second option can include the initiator node (which does not own the target VLB) reading the target VLB, such as from a corresponding location on non-volatile BE storage; and then reading PA1 from the corresponding entry E1 of the target VLB. In this second option, the target VLB read locally by the non-owning initiator node from BE non-volatile storage may not be cached by the non-owning initiator node. The third option can include the initiator node (which does not own the target VLB) reading the target VLB, such as from a corresponding location on non-volatile BE storage; and then reading PA1 from the corresponding entry E1 of the target VLB. In this third option, the target VLB read locally by the non-owning initiator node from BE non-volatile storage can be cached by the non-owning initiator node. With this third option in at least one embodiment, the initiator node can have a relatively small local cache of un-owned VLBs (e.g., VLBs which are exclusively owned by the peer node but not the initiator node). With this third option in at least one embodiment, the small local cache of un-owned VLBs can include hot or frequently accessed VLBs which are owned by the peer node.

In at least one embodiment including the three options noted above, one or more criteria can be specified to provide for dynamically selecting one of the three options at runtime in accordance with the current evaluation of the one or more criteria. In at least one embodiment, the one or more criteria can include one or more metrics. In at least one embodiment, the one or more criteria can include the latency introduced if the RPC of the first option is performed. The latency can be determined in any suitable manner. In at least one embodiment, the latency can be estimated based on prior actual issuances of the RPC of the first option alone, or in combination with, current utilization or data traffic of an internode link or connection between the initiator and peer nodes where the RPC would be issued over the internode link or connection. Generally, the higher the latency and/or the higher the internode link utilization, the more motivation to select another option other than the first option. In at least one embodiment, the one or more criteria can include a VLB cache hit rate with respect to the peer node which owns the target VLB. Generally, the higher the VLB cache hit rate of the owning node of the target VLB, the greater the motivation to send the RPC request by selecting the first option rather than reading the target VLB locally from BE non-volatile storage (as with the second or third options). In at least one embodiment, the one or more criteria can include a current utilization of BE non-volatile storage. Generally, the higher the BE utilization, the greater the motivation to send the RPC request by selecting the first option rather than selecting the second or third options which read the target VLB locally from BE non-volatile storage. In at least one embodiment, the one or more criteria can include a local VLB cache hit rate of the initiator node if a local VLB cache is used to cache VLB pages not owned by the initiator node. Generally, the higher the local VLB cache hit rate, the more motivation to use the local VLB cache and not send an RPC request (e.g., not select the first option but rather select the above-noted second or third option which is performed locally on the initiator node which received the read I/O operation).

In at least one embodiment, the criteria can indicate to select the first option and send a peer RPC request if the latency is less than a specified maximum latency threshold, if the VLB cache hit rate of the peer node is above a specified hit rate threshold, and if the BE utilization is greater than a specified utilization threshold.

In at least one embodiment, the criteria can indicate to select the first option to send a peer RPC request if the latency is less than a specified maximum latency threshold, and if the VLB cache hit rate of the peer node is above a specified hit rate threshold.

In at least one embodiment, the criteria can indicate to select the first option to send a peer RPC request if the latency is less than a specified maximum latency threshold, and if the BE utilization is greater than a specified utilization threshold.

In at least one embodiment, the criteria can indicate to select the second or third option (and not send a peer RPC request) if the latency is more than a specified maximum latency threshold, and/or if the internode link utilization is greater than a specified utilization threshold.

In at least one embodiment, the criteria can include a function F which includes one or more independent variables used to make a selection provided as an output of the function F. The one more independent variables can include one or more of: the latency introduced if the RPC of the first option is performed; current utilization of an internode link or connection between the initiator and peer nodes where the RPC would be issued over the internode link or connection; a VLB cache hit rate with respect to the peer node which owns the target VLB; a current utilization of BE non-volatile storage; and a local VLB cache hit rate of the initiator node if a local VLB cache is used to cache VLB pages not owned by the initiator node. Generally, the function F can make a selection from multiple specified or predefined options such as discussed above. In at least one embodiment, F can be used to select one of the specified options in accordance with a weighting of the multiple independent variables.

The foregoing and other aspects of the techniques of the present disclosure are described in more detail in the following paragraphs.

In at least one embodiment, a user data (UD) or client logical address, which can be the target logical address of a client I/O operation such as a read operation, can be uniquely identified using the volume or LUN ID (identifier), or more generally a storage object or resource ID, in combination with the LBA or offset of the logical address. In at least one embodiment, the logical address denoted by the combination of the volume or LUN ID and the LBA or offset can be mapped to, and represented using, a ULXA value, where the value of the ULXA can be generally characterized as an identifier uniquely identifying a particular user data (UD) page within a data storage system, and if multiple storage systems are included in a cluster, uniquely identified within the cluster of data storage systems. Thus, the ULXA can be a value that uniquely denotes or represents the logical address such as the UD logical address. From a given ULXA value, the uniquely associated LUN ID and LBA denoting a logical address can be mapped or determined. Also, given a particular LUN ID and LBA (e.g., logical address), the unique corresponding ULXA value can be mapped or determined. In the following paragraphs, reference can be made to using logical addresses. Alternatively, corresponding ULXA values can also be utilized.

The techniques of the present disclosure are described below in an exemplary embodiment of a dual node active-active data storage system or cluster where the two nodes are connected by a network link or connection as discussed above. However more generally, the techniques of the present disclosure can be used in connection with a data storage system including more than two nodes, and generally any suitable number of nodes.

Figure 7:
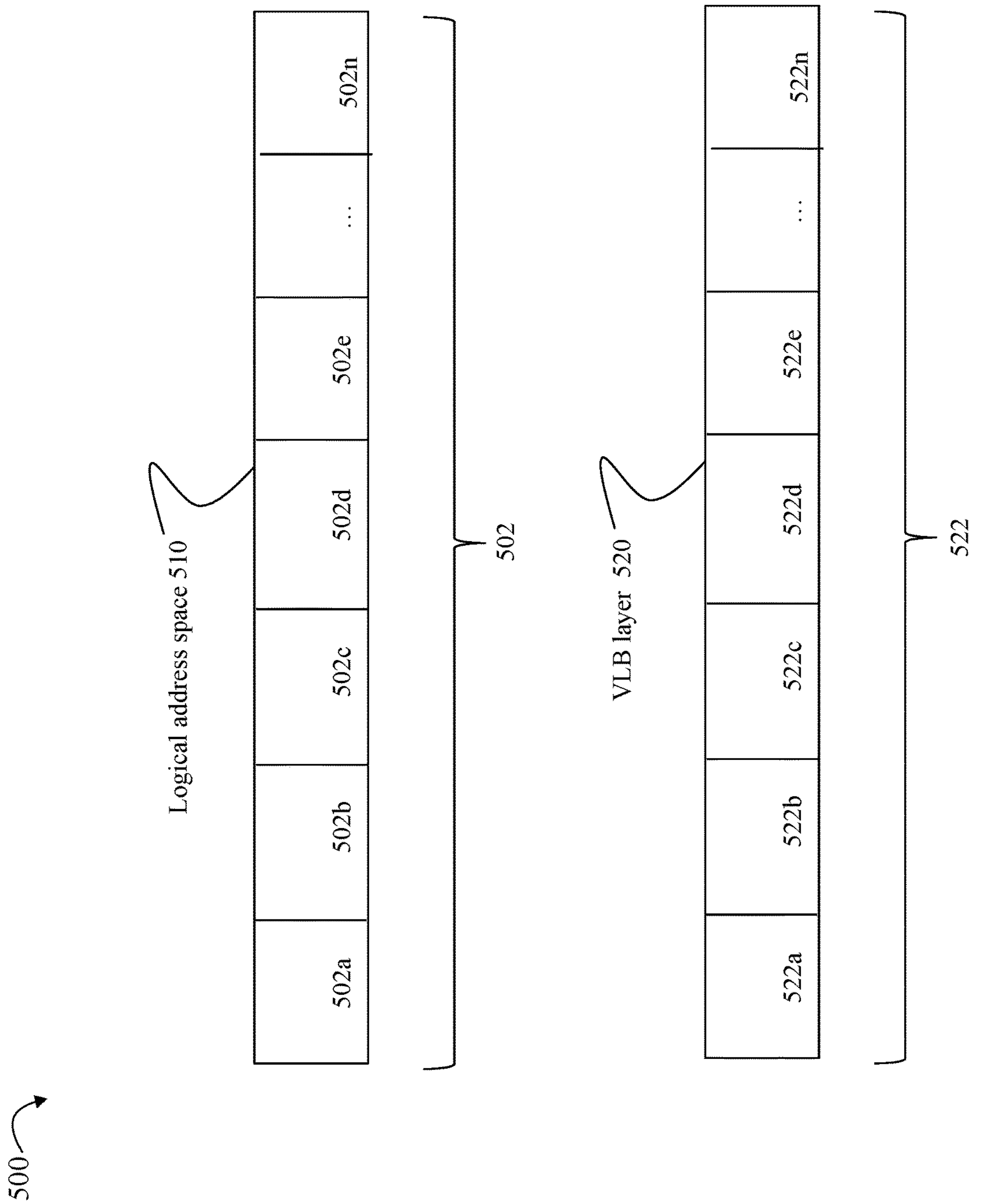
FIG. 7 is an example illustrating a partitioned logical address space and a partitioned VLB layer in at least one embodiment in accordance with the techniques of the present disclosure.

In at least one embodiment in accordance with the techniques of the present disclosure and with reference to the example 500 of FIG. 7, the user data (UD) logical address space 510 can be partitioned into multiple portions 502, such as denoted by multiple logical address portions 502*a-n*. Each of the logical address portions 502*a-n* can be a same size, such as 2 MB (megabytes), or any other suitable size. The multiple address space portions 502*a-n* can then be divided among the two nodes in any suitable manner such that a first of the nodes, such as node A, is assigned exclusive or strong ownership of a first set of the logical address portions and a second of the nodes, such as node B, is assigned exclusive or strong ownership of a second set of logical address portions.

The logical address space 510 can denote an associated logical address space of any one or more storage objects or storage space. The one or more storage objects can include, for example, one or more volumes, logical devices or LUNs; one or more sub-LUN portions; and/or one or more file systems. Generally, the logical address space 510 can denote a contiguous range of consecutive logical addresses so that each of the logical address portions 502*a-n* is mapped to a unique subrange of consecutive logical addresses of the logical address space 510. For example, consider an embodiment where each of the portions 502*a-n* is 2 MB in size. In this case, the portion 502*a* can include all logical addresses x in the subrange 0≤x<2 MB; the portion 502*b* can include all logical addresses x in the subrange 2 MB≤x<4 MB; and so on.

The logical address portions 502 can be partitioned into two sets where each logical address portion is included in only one of the two sets. The logical address portions 502 can be partitioned equally or unequally between the two nodes A and B. For example, in at least one embodiment, the entire logical address range 510 can be divided equally in half, where node A is assigned the exclusive ownership of the portions of a first half of the address range 510, and where node B is assigned the exclusive ownership of the portions of the second half of the address range 510. As another example, the logical address portions 502 can be equally partitioned into two sets such as based on even or odd logical addresses. The first data set assigned to node A can include logical address portions having an associated starting logical address which is even; and the second data set assigned to node B can include logical address portions having an associated starting logical address which is odd.

In at least one embodiment, the logical address portions of the contiguous logical address range can alternate in connection with exclusive ownership assignment among the nodes A and B. For example, the first portion 502*a* can be assigned to node A, the second portion 502*b* can be assigned to node B, the third portion 502*c* can be assigned to node A, the fourth portion 504*d* can be assigned to node B, and so on.

In at least one embodiment, ownership of a portion of the logical address space 510 can be derived from or based on the portion itself. For example, as noted above, the exclusive owner of a logical address portion can be determined based on whether the portion is classified as having an even or odd starting logical address, or whether the portion has an associated even or odd portion identifier (e.g., portions 502*a-n* can be assigned an integer identifier corresponding to relative ordering of the logical address subrange of each portion, where portion 502*a* is "1", 502*b* is "2", 502*c* is "3", and so on, as the associated logical address subranges of the portions increases). As another example, a list or other structure can be maintained which identifies the exclusive owner assigned to each of the logical address portions 502 of the logical address space 510.

In a similar manner to that noted above with respect to the logical address portions 502 of the logical address space 510, the VLBs 522*a-n* of the VLB layer 520 of mapping information can also be partitioned into two data sets, where a first of the data sets of VLBs is exclusively or strongly owned by one of the nodes such as node A, and where a second of the data sets of VLBs is exclusively or strongly owned by the other node, such as node B. Consistent with discussion above, the VLBs 522 can be partitioned into the two VLB sets using any suitable technique. The VLBs 502 can be equally partitioned into the two VLB sets such that each VLB set assigned for exclusive ownership to one of the nodes contains the same number of VLBs. Alternatively, the VLBs 502 can be unequally partitioned into the two VLB sets such that each VLB set assigned for exclusive ownership to one of the nodes contains a different number of VLBs.

In at least one embodiment, other metadata included in the mapping information for logical addresses 510 can be partitioned among the two nodes A and B. In such an embodiment with reference back to FIG. 4, the top, mid, and leaf MD pages can be partitioned or divided into two MD sets, where the node A can be assigned exclusive ownership of a first of the MD sets, and where the node B can be assigned exclusive ownership of a second of the MD sets. Generally, in at least one embodiment, the partitioning of the logical address space and the partitioning of the MD top, mid and leaf objects can be performed in a manner such that a portion of the logical address space and corresponding MD top, mid and leaf objects used to map logical addresses of the portion can be exclusively owned by the same node. In at least one embodiment, each MD leaf can denote a contiguous 2 MB logical address space portion. Each node A and B can be assigned alternating contiguous 2 MB logical address space portions each associated with a MD leaf. For example, node A can be assigned MD leaves for logical addresses 0-2 MB, 4-6 MB (e.g., MD leaf objects having even identifiers (IDs); and node B can be assigned MD leaves for logical addresses 2-4 MB and 6-8 MB (e.g., MD leaf objects having odd IDs). In at least one embodiment a 2 GB logical address portion can be associated with each mid MD object and can include multiple logical address space portions of multiple MD leaf objects. In such an embodiment, the MD leaf objects can be partitioned into even and odd groupings such as based on MD leaf object IDs noted above where a 2 GB mid MD object can be mapped to 4 even MD leaf objects and assigned to exclusive node owner A; and where a 2 GB mid MD object can be mapped to 4 odd MD leaf objects and assigned to exclusive node owner B. In at least one embodiment, a 1 TB logical address portion can be associated with each top MD object and can include multiple logical address space portions of multiple MD mid objects. In such an embodiment, the MD mid objects can be partitioned into even and odd groupings such as based on MD mid object IDs where a top MD object can be mapped to multiple even MD mid objects and assigned to exclusive node owner A; and where a top MD object can be mapped to multiple odd MD mid objects and assigned to exclusive node owner B.

As a variation to the foregoing, at least one embodiment can use non-exclusive or weak ownership assignment of the top mid, and/or leaf MD objects of FIG. 4. A non-exclusive ownership assignment of one or more MD objects associated with a set of logical address portions can be based, at least in part, on a type of I/O request. Non-exclusive ownership can be a weak ownership assignment that can be shared among multiple nodes. MD objects can be shared or assigned to a particular node with non-exclusive ownership based, at least in part, on the type of I/O request being processed or other operation being performed on a particular MD object. For example with reference to FIG. 5, for a read I/O directed to a logical address in a logical address portion, a node can be assigned non-exclusive ownership of corresponding MD top 302, mid 304, and leaf 312 objects of mapping information used to map the logical address to a corresponding physical address or location containing content stored at the logical address.

In at least one embodiment, each node can be allowed to perform operations on a logical address portion of 510 which is exclusively owned by the node without any inter-node synchronization and with node-local locking. In at least one embodiment, when an I/O directed to a logical address portion including an associated target logical address LA1 is received by an initiator node that does not own the logical address portion (and thus does not own LA1), the initiator node can send an RPC to the remote peer node which owns the logical address portion (and thus owns LA1) to perform mapper resolution processing using at least a portion of the chain of MD pages of mapping information used to map LA1 to a corresponding physical location PA1 containing content C1 stored at LA1. The mapping information for LA1 can include a particular target VLB, VLB1, where VLB1 includes an offset or entry E1, and where E1 includes PAL. In at least one embodiment, the peer node which owns the corresponding logical address LA1 can return either a VLB address (address V1 of the entry E1) or a PLB address (address PA1) depending on whether the peer node owns the target VLB1 of the mapping information for LA1. In at least one embodiment, if the peer node does not own the target VLB1, the peer node can perform resolution processing which stops traversing the chain of MD pages of mapping information once the address V1 is obtained from an entry E2 of a MD leaf of the chain. In this case, the peer node can return a VLB address, V1, to the initiator node in response to the RPC. Alternatively, if the peer node owns VLB1 as well as owns LA1, the peer node can perform resolution processing which traverses the chain of MD pages until the physical address or location PA1 is obtained. In this case, the peer node can return a PLB address, PA1, to the initiator node in response to the RPC.

In at least one embodiment, other operations such as garbage collection processing with respect to VLBs can be performed by the exclusive owner of such VLBs. Such garbage collection processing can include performing a compact and append operation to aggregate valid data from multiple source VLBs and store the aggregated valid data from the source VLBs on a single destination VLB. In one such embodiment, the source VLBs and the destination VLB can be exclusively owned by the same node.

What will now be described are flowcharts of processing steps which can be performed in at least one embodiment in accordance with the techniques of the present disclosure. The processing described below assumes that the logical address space has been partitioned into multiple logical address portions, where such logical address portions have further been assigned exclusive ownership among the nodes A and B. Additionally, the processing described below assumes that the VLBs have been partitioned and assigned exclusive ownership among the nodes A and B. The processing described below further assumes that any other desired MD objects, such as MD top, page and/or leaf objects, have also been partitioned and assigned suitable ownership (e.g., exclusive or strong and/or non-exclusive or weak) among the nodes A and B.

Figure 8A:
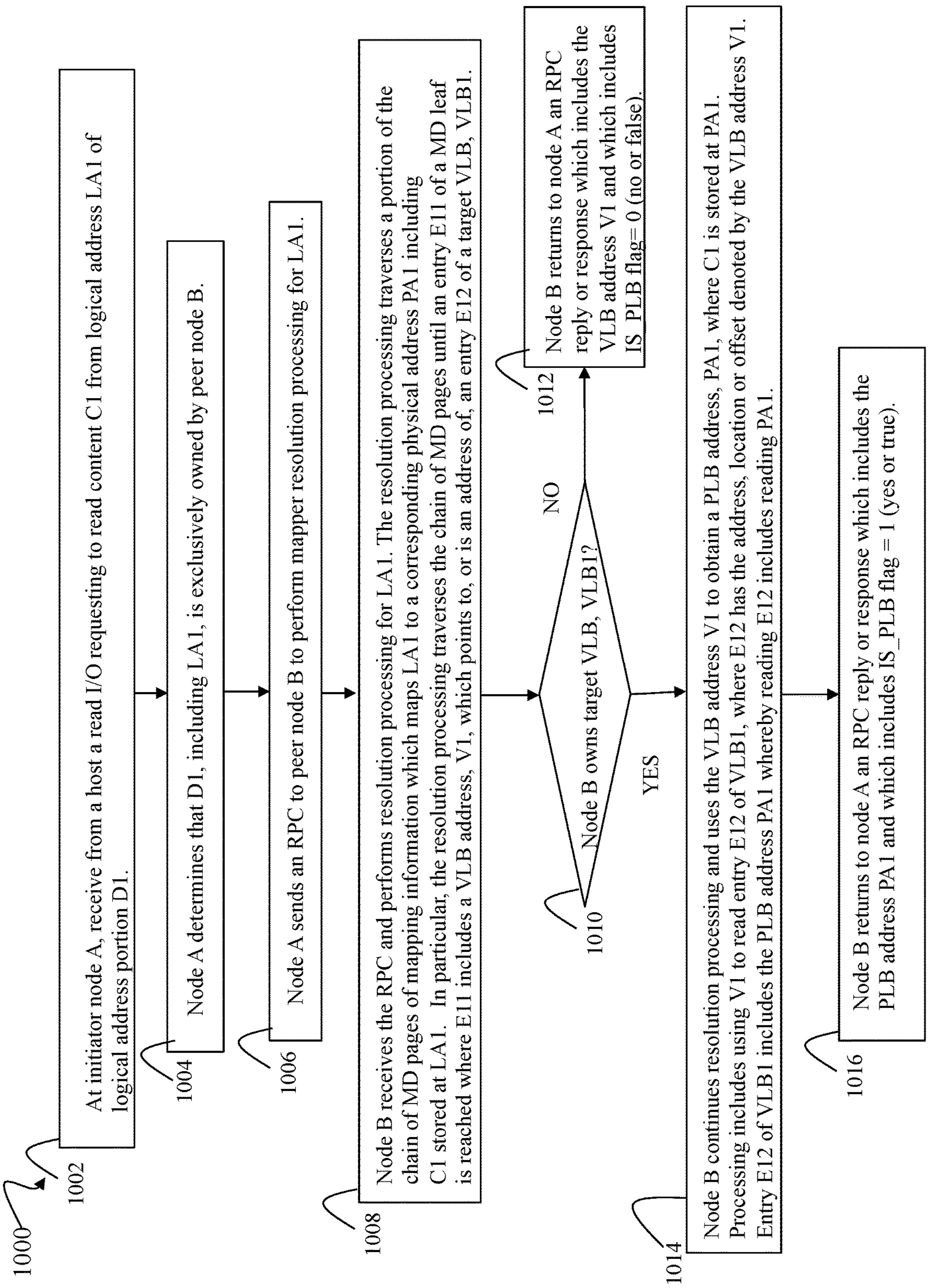
FIGS. 8A, 8B, 9, 10A and 10B are flowcharts of processing steps that can be performed in at least one embodiment in accordance with the techniques of the present disclosure.
Figure 8B:
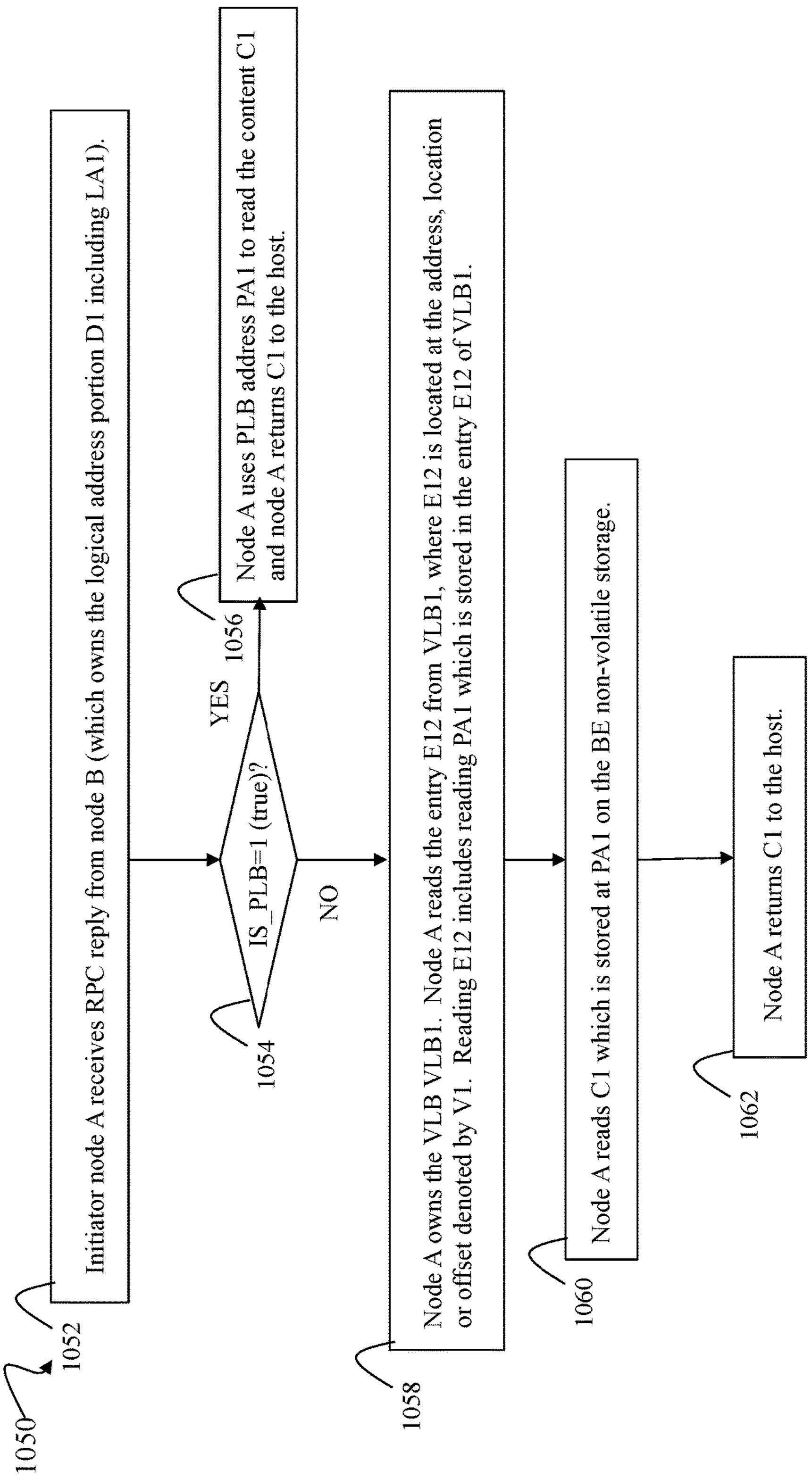

The processing of FIGS. 8A and 8B can be performed in at least one embodiment in connection with an initiator node which receives an I/O read operation directed to a logical address portion, or logical address thereof, not exclusively owned by the initiator node.

Referring to FIG. 8A, shown is a first flowchart 1000 of processing steps that can be performed in at least one embodiment in accordance with the techniques of the present disclosure.

At the step 1002, the initiator node A receives a read I/O request from a host. The read I/O requests to read content C1 from the logical address LA1 of the logical address portion D1 From the step 1002, control proceeds to the step 1004.

At the step 1004, node A determines that its peer node B exclusively owns D1, and thus node B also exclusively owns LA1. From the step 1004, control proceeds to the step 1006.

At the step 1006, node A sends an RPC to peer node B to perform mapper resolution processing (also sometimes referred to as resolution processing) for LA1. From the step 1006, control proceeds to the step 1008.

At the step 1008, node B receives the RPC and performs resolution processing for LA1. The resolution processing traverses a portion of the chain of MD pages of mapping information which maps LA1 to a corresponding physical address PA1 including C1 stored at LA1. In particular, the resolution processing traverses the chain of MD pages until an entry E11 of a MD leaf is reached, where E11 includes a VLB address, V1, which points to, or is an address of, an entry E12 of a target VLB, VLB1. From the step 1008, control proceeds to the step 1010.

At the step 1010, a determination is made by node B whether node B owns the target VLB, VLB1. If the step 1010 evaluates to no, whereby node B does not own the target VLB1, control proceeds to the step 1012. At the step 1012, node B returns to node A an RPC reply or response which includes the VLB address V1 and which includes the IS_PLB flag set to 0 (e.g., to denote that the returned address or pointer type is not a PLB address but is rather a VLB address). If the step 1010 evaluates to yes, control proceeds to the step 1014.

At the step 1014, node B continues resolution processing and generally uses the VLB address V1 to obtain a PLB address, PA1, where C1 is stored at PAL. Processing includes using V1 to read entry E12 of VLB1, where E12 has the address, location or offset denoted by the VLB address V1. Entry E12 of VLB1 includes the PLB address PA1 whereby reading E12 includes reading PA1. Generally in the step 1014, the VLB1 owning node B reads VLB1. VLB1 can be stored in the cache of node B. If so, a VLB cache hit occurs and VLB1, and thus entry E12 can be directly read from node B's local cache. If VLB1 is not cached on node B (e.g., VLB cache miss occurs) node B can read VLB1 from BE non-volatile storage and then node B can store VLB1 in node B's cache. The entry E12 can be read from the copy of VLB1 as obtained from the BE non-volatile storage. From the step 1014, control proceeds to the step 1016.

At the step 1016, node B returns to node A an RPC reply or response which includes the PLB address PA1 and which includes the IS_PLB flag set to 1 (e.g., to denote that the returned address or pointer type is a PLB address rather than a VLB address).

Referring to FIG. 8B, shown is a second flowchart 1050 of processing steps that can be performed in at least one embodiment in accordance with the techniques of the present disclosure. The steps of 1050 can be performed subsequent to performing the steps of FIG. 8A. The steps of FIG. 8B can be performed by the initiator node A where, in the step 1052, the initiator node A receives the RPC reply from node B (which owns the logical address portion D1 includes LA1). Generally, the RPC reply can be sent from node B to node A in either the step 1016 or the step 1012 depending, respectively, on whether node B owns or does not own the target VLB, VLB1. From the step 1052, control proceeds to the step 1054.

At the step 1054, a determination is made by node A whether the IS_PLB flag returned in the RPC reply (received from node B in the step 1052) is 1 or true. If the step 1054 evaluates to yes as a result of IS_PLB being 1 or true, control proceeds to the step 1056. At this point, the address or pointer included in the RPC reply is determined to be a PLB address and that node B owns the target VLB, VLB1. At the step 1056, node A uses the PLB address PA1 returned in the RPC reply to read the content C1 from the BE non-volatile storage. Node A then returns C1 to the host which issued the read I/O received in the step 1002. If the step 1054 evaluates to no where IS_PLB=0 or false, control proceeds to the step 1058. At this point, the address or pointer included in the RPC reply is determined to be a VLB address and that node A owns the target VLB, VLB1.

At the step 1058, node A reads the target VLB, VLB1. In particular, node A reads the entry E12 of VLB1, where E12 is located at the address, location or offset denoted by V1 (also returned in the RPC response from node B). Reading E12 includes reading PA1, which is stored in the entry E12 of VLB1. Generally in the step 1058, the VLB1 owning node A reads VLB1. VLB1 can be stored in the cache of node A. If so, a VLB cache hit occurs and VLB1, and thus entry E12 can be directly read from node A's local cache. If VLB1 is not cached on node A (e.g., VLB cache miss occurs) node A can read VLB1 from BE non-volatile storage and then node A can store VLB1 in node A's cache. The entry E12 can be read from the copy of VLB1 as obtained from the BE non-volatile storage. From the step 1058, control proceeds to the step 1060.

At the step 1060, node A reads C1 which is stored at PA1 on the BE non-volatile storage. From the step 1060, control proceeds to the step 1062.

At the step 1062, node A returns C1 to the host which issued the read I/O received by node A in the step 1002.

In connection with processing described in connection with FIGS. 8A, 8B and 9, and generally in connection with the techniques of the present disclosure, the target VLB can be read, accessed and accordingly cached by the node which exclusively owns the target VLB. In at least one embodiment described in connection with FIGS. 8A, 8B and 9, VLBs may only be read, accessed and cached by the owning node.

Figure 9:
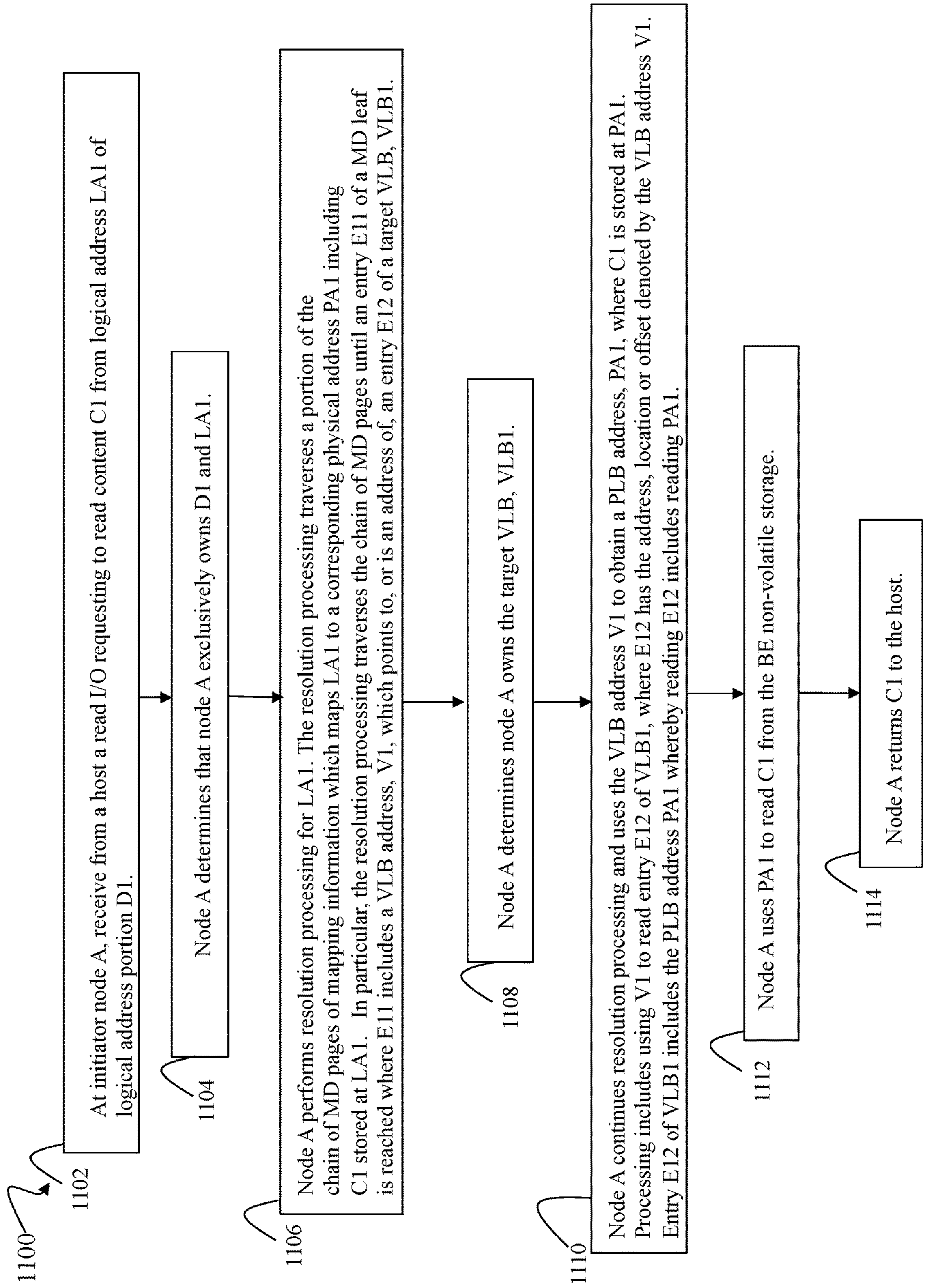

Referring to FIG. 9, shown is a flowchart 1100 of processing steps that can be performed in at least one embodiment in accordance with the techniques of the present disclosure. The steps of FIG. 9 can be performed in connection with an initiator node A which owns the target logical address portion (and thus the target logical address LA1) and which also owns the target VLB corresponding to the target logical address portion.

At the step 1102, at the initiator node A, a host read I/O is received. The read I/O requests to read content C1 from logical address LA1 of logical address portion D1. From the step 1102, control proceeds to the step 1104.

At the step 1104, node A determines that node A exclusively owns D1 and LA1. From the step 1104, control proceeds to the step 1106.

At the step 1106, node A performs resolution processing for LA1. The resolution processing traverses a portion of the chain of MD pages of mapping information which maps LA1 to a corresponding physical address PA1 including C1 stored at LA1. In particular, the resolution processing traverses the chain of MD pages until an entry E11 of a MD leaf is reached where E11 includes a VLB address, V1, which points to, or is an address of, an entry E12 of a target VLB, VLB1. From the step 1106, control proceeds to the step 1108.

At the step 1108, node A determines that node A exclusively owns the target VLB, VLB1. From the step 1108, control proceeds to the step 1110.

At the step 1110, node A continues resolution processing and uses the VLB address, V1, to obtain a corresponding PLB address, PA1, where C1 is stored at PAL. Processing includes using V1 to read entry E12 of VLB1, where E12 has the address, location or offset denoted by the VLB address V1. Entry E12 of VLB1 includes the PLB address PA1 whereby reading E12 includes reading PAL. Generally, the VLB owning node is node A where only node A accesses, reads and caches VLB1. If VLB1 is in node A's cache (e.g., VLB cache hit), then entry E12 and thus PA1 can be read from node A's cached copy of VLB1. If VLB1 is not in node A's cache (e.g., VLB cache miss), then node A can read VLB1 from BE non-volatile storage, store VLB1 in node A's cache, and obtain PA1 by reading the entry E12 (located at the VLB address V1) of the cached copy of VLB1 as stored in node A's cache. From the step 1110, control proceeds to the step 1112.

At the step 1112, node A uses PA1 to read C1 from BE non-volatile storage. From the step 1112, control proceeds to the step 1114.

At the step 1114, node A returns C1 to the host which issued the read I/O (received in the prior step 1102).

Figure 10A:
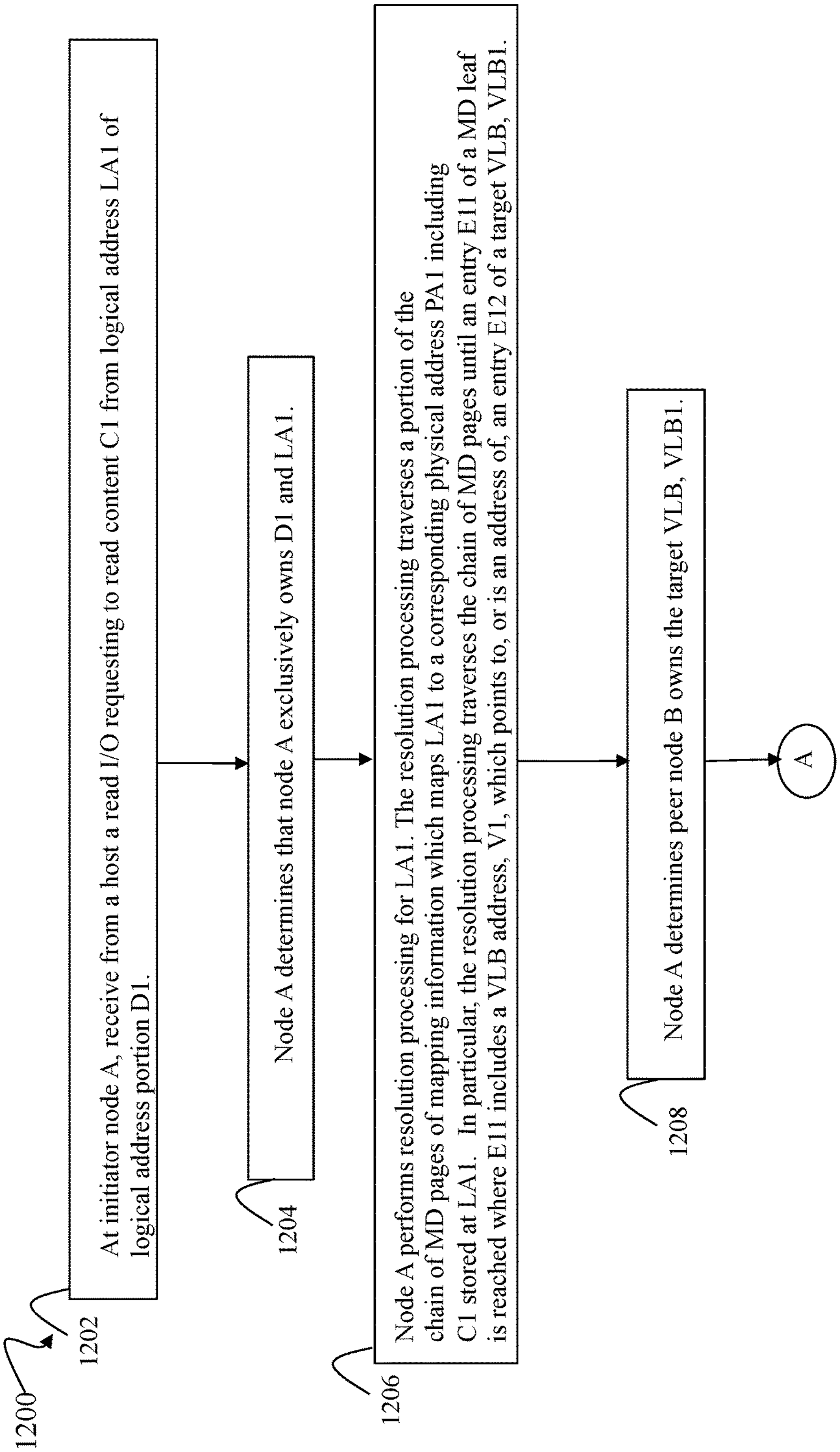
Figure 10B:
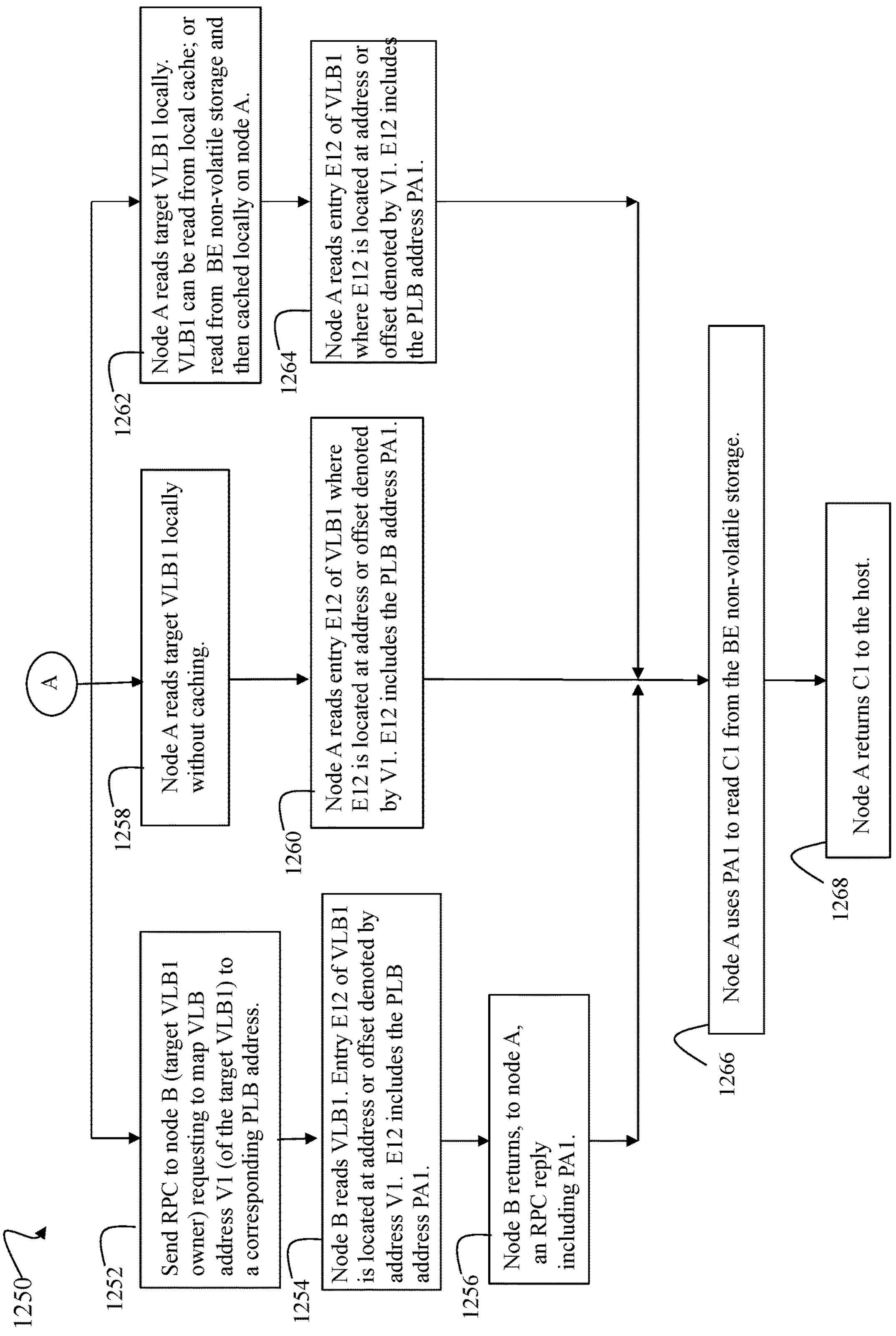

Referring to FIGS. 10A-10B, shown is a flowchart 1200, 1250 of processing steps that can be performed in at least one embodiment in accordance with the techniques of the present disclosure. The processing of FIGS. 10A-10B can be performed in connection with an initiator node A which receives a read I/O directed to a logical address portion, where the initiator node A exclusively owns the logical address portion and where the peer node B exclusively owns the target VLB corresponding to the logical address portion. In this scenario where the peer node B exclusively owns the target VLB, an embodiment can consider multiple options discussed below and elsewhere herein where ownership rules regarding the target VLB can be relaxed to varying degrees. In particular, an embodiment can implement the first option discussed herein which strictly follows exclusive target VLB ownership where only the exclusive owner can read, access and cache the owned VLB. Additionally, an embodiment can implement one or more options which can relax the foregoing exclusive ownership rules or behavior. In particular, the second and third options discussed herein provide various degrees of relaxation of the exclusive VLB ownership behavior. For example, with the second option in at least one embodiment, the non-owning node with respect to a VLB can be allowed to read but not locally cache the VLB. With a further relaxation of exclusive ownership, the third option can allow a non-owning node with respect a VLB to read the VLB locally and also to cache a small number of VLBs which are not exclusively owned by the node.

At the step 1202, the initiator node A receives a read I/O from a host. The read I/O requests to read content C1 from logical address LA1 of the logical address portion D1. From the step 1202, control proceeds to the step 1204.

At the step 1204, node A determines that node A exclusively owns D1 and LA1. From the step 1204, control proceeds to the step 1206.

At the step 1206, node A performs resolution processing for LA1. The resolution processing traverses a portion of the chain of MD pages of mapping information which maps LA1 to a corresponding physical address PA1 including C1 stored at LA1. In particular, the resolution processing traverses the chain of MD pages until an entry E11 of a MD leaf is reached, where E11 includes a VLB address, V1, which points to, or is an address of, an entry E12 of a target VLB, VLB1.

At this point, processing can be performed to select one of multiple defined options in at least one embodiment. In at least one embodiment, processing can be performed to select one of three defined options which are also discussed herein. If the first option is selected, control proceeds to the step 1252. If the second option is selected, control proceeds to the step 1254. If the third option is selected, control proceeds to the step 1262.

In at least one embodiment, selection of one of the above-noted three options can be evaluated and performed at runtime in accordance with one or more criteria as described in more detail elsewhere herein. As a variation, an embodiment can alternatively have an associated workflow which only defines or makes available two of the denoted options. In this case, processing can select from the available two options. As yet a further variation, in at least one embodiment, there may not be any selection from multiple available options. Rather, in this latter case, the workflow may include only a single option which is performed. In this latter case, the workflow can generally include any one of the three options thereby providing the specified option in the workflow.

In at least one embodiment including the three options described herein, one or more criteria can be specified to provide for dynamically selecting one of the three options at runtime in accordance with the current evaluation of the one or more criteria. In at least one embodiment, the one or more criteria can include one or more metrics. In at least one embodiment, the one or more criteria can include the latency introduced if the RPC of the first option is performed. The latency can be determined in any suitable manner. In at least one embodiment, the latency can be estimated based on prior actual issuances of the RPC of the first option alone, or in combination with, current utilization or data traffic of an internode link or connection between the initiator and peer nodes where the RPC would be issued over the internode link or connection. Generally, the higher the latency and/or the higher the internode link utilization, the more motivation to select another option other than the first option. In at least one embodiment, the one or more criteria can include a VLB cache hit rate with respect to the peer node which owns the target VLB. Generally, the higher the VLB cache hit rate of the owning node of the target VLB, the greater the motivation to send the RPC request by selecting the first option rather than reading the target VLB locally from BE non-volatile storage (as with the second or third options). In at least one embodiment, the one or more criteria can include a current utilization of BE non-volatile storage. Generally, the higher the BE utilization, the greater the motivation to send the RPC request by selecting the first option rather than selecting the second or third options which read the target VLB locally from BE non-volatile storage. In at least one embodiment, the one or more criteria can include a local VLB cache hit rate of the initiator node if a local VLB cache is used to cache VLB pages not owned by the initiator node. Generally, the higher the local VLB cache hit rate, the more motivation to use the local VLB cache and not send an RPC request (e.g., not select the first option but rather select the above-noted second or third option which is performed locally on the initiator node which received the read I/O operation).

In at least one embodiment, the criteria can indicate to select the first option and send a peer RPC request if the latency is less than a specified maximum latency threshold, if the VLB cache hit rate of the peer node is above a specified hit rate threshold, and if the BE utilization is greater than a specified utilization threshold.

In at least one embodiment, the criteria can indicate to select the first option to send a peer RPC request if the latency is less than a specified maximum latency threshold, and if the VLB cache hit rate of the peer node is above a specified hit rate threshold.

In at least one embodiment, the criteria can indicate to select the first option to send a peer RPC request if the latency is less than a specified maximum latency threshold, and if the BE utilization is greater than a specified utilization threshold.

In at least one embodiment, the criteria can indicate to select the second or third option (and not send a peer RPC request) if the latency is more than a specified maximum latency threshold, and/or if the internode link utilization is greater than a specified utilization threshold.

In at least one embodiment, the criteria can include a function F which includes one or more independent variables used to make a selection provided as an output of the function F. The one more independent variables can include one or more of: the latency introduced if the RPC of the first option is performed; current utilization of an internode link or connection between the initiator and peer nodes where the RPC would be issued over the internode link or connection; a VLB cache hit rate with respect to the peer node which owns the target VLB; a current utilization of BE non-volatile storage; and a local VLB cache hit rate of the initiator node if a local VLB cache is used to cache VLB pages not owned by the initiator node. Generally, the function F can make a selection from multiple specified or predefined options such as discussed above. In at least one embodiment, F can be used to select one of the specified options in accordance with a weighting of the multiple independent variables.

If the first option is selected, control proceeds to the step 1252. At the step 1252, node A sends an RPC to node B (the target VLB1 owner) requesting that node B map the VLB address V1 (an entry, offset, address or location in the target VLB1) to a corresponding PLB address. From the step 1252, control proceeds to the step 1254.

At the step 1254, node B reads VLB1. Consistent with other discussion herein, if VLB1 is in node B's cache (VLB cache hit), node B can read necessary information from its cached copy of VLB1. If VLB1 is not in node B's cache (VLB cache miss) node B can read VLB1 from BE non-volatile storage, store VLB1 in node B's cache, and then read the necessary information from its cached copy of VLB1. Entry E12 of VLB1 is located at an address or offset denoted by V1. E12 includes the PLB address PAL. Thus, node B can read PA1 from its cached copy of VLB1. From the step 1254, control proceeds to the step 1256.

At the step 1256, node B returns to node A an RPC reply or response including PA1. From the step 1256, control proceeds to the step 1266.

If the second option is selected, control proceeds to the step 1258. At the step 1258, node A reads the target VLB1 locally without retaining a copy of VLB1 in node A's cache. Thus, the step 1258 includes node A reading the target VLB1 from BE non-volatile storage. From the step 1258, control proceeds to the step 1260.

At the step 1260, node A reads entry E12 of VLB1 where E12 is located at the address or offset denoted by V1. E12 includes the PLB address PAL. From the step 1260, control proceeds to the step 1266.

If the third option is selected, control proceeds to the step 1262. At the step 1262, node A reads the target VLB1 locally and can maintain a small cache of non-owned VLBs. Node A reading the target VLB1 can include determining whether VLB1 is in node A's cache thereby resulting in a cache hit. If so, node A's cached copy of VLB1 can be used to read the desired information in the step 1264. Otherwise, if there is a VLB cache miss where VLB1 is not in node A's cache, VLB1 can be read from BE non-volatile storage and then cached locally on node A. The cached copy of VLB1 (as just read from the non-volatile BE storage) can be used to read the desired information in the step 1264. From the step 1262, control proceeds to the step 1264.

At the step 1264, node A read entry E12 of VLB1 where E12 is located at the address, offset or location denoted by V1. E12 includes the PLB address PAL. Control proceeds from the step 1264 to the step 1266.

At the step 1266, node A uses PA1 to read C1 from BE non-volatile storage. From the step 1266, control proceeds to the step 1268.

At the step 1268, node A returns C1 to the host which sent the read I/O (e.g., as received in the step 1202).

In connection with the processing of FIGS. 10A-10B, when a read I/O directed to a target logical address LA1 is received by an initiator node that owns LA1 (and thus owns the corresponding logical address portion including LA1) but where the initiator node does not own a corresponding target VLB, processing associated with the corresponding target VLB can be characterized as less optimized in comparison to other scenarios and processing such as described in connection with FIGS. 8A, 8B and 9. However, assuming a worst case in at least one embodiment, at most an average of 25% of I/O reads can be expected to fall into this category and utilize processing of FIGS. 10A-10B. In such an embodiment, VLB ownership can have a tendency to correlate with corresponding logical address and logical address portion ownership.

In connection with processing described herein in at least one embodiment, a read I/O operation requesting to read content C1 from a logical address LA1 can be serviced using content that may be included in a user data (UD) log. In at least one embodiment, the UD log can be as described elsewhere herein where content written by a write I/O can be stored in the UD log and then subsequently destaged to BE non-volatile storage. A read I/O directed to LA1 may possibly be serviced using the UD log if the UD log includes C1 as stored at LA1. In this case, the processing described herein such as in connection with workflows of FIGS. 8A, 8B, 9, and 10A-10B would not be performed since the requested content C1 for LA1 is serviced using content of the UD log.

The processing described above can be performed in connection with a single block read I/O associated with a single logical address. More generally, the same workflow and logic can be extended for use with multiple block read I/Os directed to multiple logical addresses. In at least one embodiment, a single host read I/O to multiple blocks (and thus multiple logical addresses and also multiple corresponding PLB addresses) can be split into subsets, where each subset can include multiple logical addresses associated with the same VLB. To further illustrate, reference is made to FIGS. 8A and 8B. In connection with this workflow, the RPC (sent from the initiator node A to the node B which owns the VLB1) can include 3 logical addresses LA1, LA2 and LA3 each having an associated PLB address. The node B which owns VLB1 can return a PLB address for each of the 3 logical addresses associated with the owned VLB1, and otherwise, can return a VLB address for the logical address. If, for example, all 3 logical addresses are associated with VLB1, then node B can return 3 corresponding PLB addresses.

In at least one embodiment, a single host read I/O can be partitioned into multiple read I/Os for processing in the data storage system in a manner which is transparent to the host. Each of the multiple read I/Os can be processed and the results of all such multiple read I/Os can then be aggregated on the data storage system to return a single read I/O response to the host. For example, a host read I/O can request to read content from multiple logical addresses in multiple logical address portions, where at least a first of multiple logical address portions (and at least a first of the logical addresses) is owned by node A, and where at least a second of the multiple address portions (and at least a second of the logical addresses) is owned by node B. In this case, the single host read I/O can be partitioned by the storage system into two smaller read I/Os, where a first of the two read I/Os is processed by node A for those logical addresses and logical address space portions owned by node A, and where a second of the two read I/Os is processed by node B for those logical addresses and logical address space portions owned by node B. Subsequently, the content read by both the first and second smaller read I/Os can be combined or aggregated to return a response to the host read I/O. In at least one embodiment, the initiator node which received the single host read I/O can perform the partitioning and aggregation as may be needed.

Consistent with other discussion herein, mapping information including the chain of MD pages can be updated and/or created when flushing a recorded write I/O writing content C2 to a logical address LA2 from the UD log to BE non-volatile storage. Flushing processing can include storing the written content C2 on BE non-volatile storage at a PLB address PA2. For the first or initial write to LA2, flushing processing can also include allocating any needed VLB or other MD page included in the chain of MD pages of mapping information mapping LA2 to PA2.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:

receiving, at a first node from a host, a read I/O operation requesting to read content C1 from a first logical address LA1, where the first node and a second node are included in a data storage system;

determining that LA1 is owned by the second node but not owned by the first node;

sending, from the first node to the second node, a first request requesting that the second node perform first resolution processing for LA1; and responsive to receiving the first request at the second node, the second node performing said first resolution processing for LA1, wherein said first resolution processing includes:

mapping LA1 to a first entry E1 of a first metadata (MD) leaf object, wherein E1 includes a first virtual layer block (VLB) address which corresponds to a first VLB of a virtual block layer;

determining whether the second node owns the first VLB;

responsive to determining the second node does not own the first VLB, sending a first response from the second node to first node, where the first response includes the first VLB address and includes a first indicator with a first setting which indicates that the first response includes a VLB address type; and responsive to determining that second node does own the first VLB, performing first processing including:

the second node using the first VLB address to obtain a first physical address or location PA1 on non-volatile storage, wherein C1 is stored at PA1; and sending the first response from the second node to the first node, wherein the first response includes PA1 and includes the first indicator with a second setting which indicates that the first response includes a physical layer block (PLB) address type.

2. The computer-implemented method of claim 1, wherein the VLB address type is an indirect pointer or address used to indirectly access stored content.

3. The computer-implemented method of claim 2, wherein the PLB address type is a physical address or location of stored content on non-volatile storage.

4. The computer-implemented method of claim 3, further comprising:

receiving, at the first node from the second node, the first response;

determining, by the first node, whether the first indicator of the first response has the first setting or the second setting; and responsive to determining that the first indicator has the first setting, the first node determining that the first response includes the VLB address type, and the first node performing second processing which includes using the first VLB address to read C1 from PA1.

5. The computer-implemented method of claim 4, wherein the first VLB address identifies a VLB entry E2 of the first VLB, wherein E2 includes PA1, and wherein the second processing includes:

reading, by the first node, the first VLB from non-volatile storage;

caching, by the first node, the first VLB in a local cache of the first node;

reading, by the first node, PA1 from E2 of the first VLB;

reading, by the first node, C1 which is stored at PA1 on non-volatile storage; and returning, by the first node, C1 to the host in a read I/O response.

6. The computer-implemented method of claim 4, further comprising:

responsive to determining that the first indicator has the second setting, the first node determining that the first response includes the PLB address type, and performing third processing comprising:

reading, by the first node, C1 from PA1; and returning, by the first node, C1 to the host in a read I/O response.

7. The computer-implemented method of claim 6, wherein the second node using the first VLB address to obtain PA1 further comprises:

reading, by the second node, the first VLB from non-volatile storage;

caching, by the second node, the first VLB in a local cache of the second node; and reading, by the second node, PA1 from E2 of the first VLB.

8. The computer-implemented method of claim 1, further comprising:

partitioning a plurality of virtual layer blocks (VLBs) of the virtual block layer into a plurality of sets including a first set and a second set, wherein the first node is assigned exclusive ownership of VLBs in the first set and wherein the second node is assigned exclusive ownership of VLBs in the second set.

9. The computer-implemented method of claim 8, further comprising:

partitioning a logical address space into a plurality of logical address portions; and dividing the plurality of logical address portions into a plurality of logical address sets including a first logical address set and a second logical address sets, wherein the first node is assigned exclusive ownership of logical address portions of the first logical address set, and wherein the second node is assigned exclusive ownership of logical address portions of the second logical address set.

10. A non-transitory computer readable medium comprising code stored thereon that, when executed, performs a method comprising:

receiving, at a first node from a host, a read I/O operation requesting to read content C1 from a first logical address LA1, where the first node and a second node are included in a data storage system;

determining that LA1 is owned by the first node;

the first node performing first resolution processing for LA1, wherein the first resolution processing includes the first node mapping LA1 to a first entry E1 of a first metadata (MD) leaf object, wherein E1 includes a first virtual layer block (VLB) address which corresponds to a first VLB of a virtual block layer;

determining, by the first node, whether the first node or the second node owns the first VLB; and responsive to determining that the first node owns the first VLB, performing first processing including:

the first node using the first VLB address to obtain a first physical address or location PA1 on non-volatile storage, wherein C1 is stored at PA1;

the first node reading C1 from PA1; and the first node returning C1 to the host in a read I/O response.

11. The non-transitory computer readable medium of claim 10, wherein the first VLB address identifies a second entry E2 of the first VLB, and wherein the first node using the first VLB address to obtain a first physical address or location PA1 on non-volatile storage further includes:

the first node reading the first VLB from non-volatile storage;

the first node caching the first VLB in a local cache of the first node; and the first node reading PA1 from E2 of the first VLB.

12. The non-transitory computer readable medium of claim 11, further comprising:

determining, by the first node, that the second node owns the first VLB; and responsive to determining that the second node owns the first VLB, performing second processing including:
selecting one option from a plurality of processing options;
performing processing of the selected one option to obtain PA1 for the first node;
the first node using PA1 to read C1 from non-volatile storage; and
the first node returning C1 in a read I/O response to the host.

13. The non-transitory computer readable medium of claim 12, wherein the plurality of options includes a first option, wherein processing of the first option includes:
sending a request, from the first node to the second node, requesting that the second node map the first VLB address of the first VLB to a corresponding physical address, PA1;
receiving, by the second node, the request;
reading, by the second node, the first VLB from non-volatile storage;
storing the first VLB in a local cache of the second node;
reading, by the second node, PA1 from E2 of the first VLB; and
the second node returning a response to the first node, wherein the response includes PAL.

14. The non-transitory computer readable medium of claim 12, wherein the plurality of options includes a second option, wherein processing of the second option includes:
the first node reading the first VLB from non-volatile storage and not caching the first VLB locally on the first node; and
the first node reading PA1 from E2 of the first VLB.

15. The non-transitory computer readable medium of claim 12, wherein the plurality of options includes a third option, wherein processing of the third option includes:
the first node reading the first VLB from non-volatile storage;
the first node caching the first VLB locally on the first node; and
the first node reading PA1 from E2 of the first VLB.

16. The non-transitory computer readable medium of claim 12, wherein said selecting said one option from the plurality of options includes:
evaluating one or more criteria dynamically at runtime to select said one option from the plurality of options.

17. The non-transitory computer readable medium of claim 16, wherein the one or more criteria selects said one option in accordance with one or more metrics, the one or more metrics including any of: latency introduced by issuing a request from the first node to the second node; a VLB page cache hit rate with respect a first local cache of the first node; a VLB page cache hit rate with respect a second local cache of the second node; and a current utilization of backend non-volatile storage including PA1 where C1 is stored.

18. The non-transitory computer readable medium of claim 17, wherein the one or more criteria includes a first criterion which indicates to select a first option of the plurality of options if the latency is less than a specified threshold, wherein the first option includes issuing the request, from the first node to the second node, requesting that the second node map the first VLB address of the first VLB to a corresponding physical address, PAL.

19. The non-transitory computer readable medium of claim 18, wherein the one or more criteria includes a second criterion which indicates to select a second option of the plurality of options or a third option of the plurality of options if the latency is not less than the specified threshold and if the current utilization of backend non-volatile storage is less than a utilization threshold, wherein the second option and the third option both include the first node locally reading the first VLB from backend non-volatile storage.

20. A system comprising:
one or more processors; and
a memory comprising code stored thereon that, when executed, performs a method comprising:
receiving, at a first node from a host, a read I/O operation requesting to read content C1 from a first logical address LA1, where the first node and a second node are included in a data storage system;
determining that LA1 is owned by the second node but not owned by the first node;
sending, from the first node to the second node, a first request requesting that the second node perform first resolution processing for LA1; and
responsive to receiving the first request at the second node, the second node performing said first resolution processing for LA1, wherein said first resolution processing includes:
mapping LA1 to a first entry E1 of a first metadata (MD) leaf object, wherein E1 includes a first virtual layer block (VLB) address which corresponds to a first VLB of a virtual block layer;
determining whether the second node owns the first VLB;
responsive to determining the second node does not own the first VLB, sending a first response from the second node to first node, where the first response includes the first VLB address and includes a first indicator with a first setting which indicates that the first response includes a VLB address type; and
responsive to determining that second node does own the first VLB, performing first processing including:
the second node using the first VLB address to obtain a first physical address or location PA1 on non-volatile storage, wherein C1 is stored at PA1; and
sending the first response from the second node to the first node, wherein the first response includes PA1 and includes the first indicator with a second setting which indicates that the first response includes a physical layer block (PLB) address type.

* * * * *